(12) United States Patent
Sugo et al.

(10) Patent No.: US 6,659,751 B1
(45) Date of Patent: Dec. 9, 2003

(54) APPARATUS FOR RADIATION-INDUCED GRAFT POLYMERIZATION TREATMENT OF FABRIC WEBS

(75) Inventors: Takanobu Sugo, Gunma (JP); Kunio Fujiwara, Kanagawa (JP); Hideo Kawazu, Kanagawa (JP); Teruo Masubuchi, Chiba (JP); Junichi Kanno, Kanagawa (JP); Naotoshi Endo, Tokyo (JP); Masaji Akahori, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/762,583

(22) PCT Filed: Aug. 10, 1999

(86) PCT No.: PCT/JP99/04307
§ 371 (c)(1),
(2), (4) Date: Feb. 9, 2001

(87) PCT Pub. No.: WO00/09797
PCT Pub. Date: Feb. 24, 2000

(30) Foreign Application Priority Data

Aug. 12, 1998 (JP) ............................................. 10/227767
Aug. 12, 1998 (JP) ............................................. 10/227768
Aug. 12, 1998 (JP) ............................................. 10/241023

(51) Int. Cl.$^7$ ............................................. D06M 14/26
(52) U.S. Cl. ..................... 425/115; 118/641; 264/485; 264/495; 425/174.4; 427/551
(58) Field of Search .................. 264/485, 495; 427/551; 425/115, 174.4; 118/641

(56) References Cited

U.S. PATENT DOCUMENTS 2,940,869 A * 6/1960 Graham ....................... 427/551
3,628,987 A * 12/1971 Nakata et al. ............... 428/353

(List continued on next page.)

FOREIGN PATENT DOCUMENTS

| JP | 1-258740 | 10/1989 |
| JP | 1-292174 | 11/1989 |
| JP | 2-265633 | 10/1990 |
| JP | 6-55995 | 7/1994 |
| JP | 7-290627 | 11/1995 |
| JP | 8-199480 | 8/1996 |
| JP | 9-173733 | 7/1997 |

OTHER PUBLICATIONS

Radiation Application Technology Handbook, p. 266–268, publication date: Nov. 25, 1990 with English translation of relevant portions.
Cat and Graft Polymerization, p. 130, Mar. 1996, with English translation of relevant portions.
Radiation Processing, p. 219, May 1969, with English translation of relevant portions.

*Primary Examiner*—Robert Davis
(74) *Attorney, Agent, or Firm*—Armstrong, Westerman & Hattori, LLP

(57) ABSTRACT

A polymer substrate for radiation-induced graft polymerization in the form of a woven or non-woven fabric that comprises a woven or non-woven fabric composed of polymer fiber and a reinforcement polymer having a greater strength and a slower rate of radiation-induced graft polymerization than said polymer fiber. Also, radiation graft treated stock prepared from said polymer substrate. In another aspect, a radiation graft treated material in the form of a woven or non-woven fabric material that is composed of polymer monofilament fiber of which only the surface has undergone a radiation-induced graft polymerization but of which the center remains unaffected by grafting. In addition, a method for performing radiation-induced graft polymerization on substrates in the form of webs of woven or non-woven fabric, which comprises the steps of exposing a substrate woven or non-woven fabric composed of polymer fiber to electron beams in a nitrogen atmosphere, contacting the irradiated substrate with a specified amount of monomer in a nitrogen atmosphere, and subjecting the monomer and the substrate in mutual contact to graft polymerization in a nitrogen atmosphere, characterized in that the first through third steps are performed in succession.

3 Claims, 8 Drawing Sheets

U.S. PATENT DOCUMENTS

| | | | |
|---|---|---|---|
| 4,173,659 A | * 11/1979 | Dubois et al. | 427/551 |
| 4,190,623 A | * 2/1980 | Bobeth et al. | 264/485 |
| 4,533,566 A | * 8/1985 | Evans et al. | 427/551 |
| 4,594,262 A | * 6/1986 | Kreil et al. | 427/551 |
| 4,865,743 A | * 9/1989 | Ellinghorst et al. | 264/485 |
| 5,183,600 A | * 2/1993 | Scher et al. | 264/495 |
| 5,743,940 A | 4/1998 | Sugo et al. | 95/285 |
| 5,783,608 A | 7/1998 | Sugo et al. | 521/29 |
| 6,228,314 B1 | * 5/2001 | Trueblood et al. | 264/485 |

* cited by examiner (a)

(b)

(a)

(b)

US 6,659,751 B1

APPARATUS FOR RADIATION-INDUCED GRAFT POLYMERIZATION TREATMENT OF FABRIC WEBS

TECHNICAL FIELD

This invention relates to polymer substrates for radiation-induced graft polymerization that are made from polymer fibers, particularly from polyethylene fiber, as well as: radiation graft treated stock that is produced by introducing functional radicals into the substrates by means of radiation-induced graft polymerization. The invention also relates to an improvement in the method of radiation-induced graft polymerization that is applied to polymer substrates in the form of a woven or non-woven fabric.

BACKGROUND ART

Radiation-induced graft polymerization is a technique by which a substrate polymer is irradiated to form radicals and a polymerizable monomer is grafted onto the radicals. Since functional radicals can be introduced into various shapes of high-molecular weight compounds, radiation-induced graft polymerization is drawing increasing attention these days as a process for producing materials having a separating capability. The attention is especially significant when it comes to methods of producing stock for air purifying chemical filters which have recently seen increasing use in purifying the air in clean rooms employed in precision electronics such as semiconductor fabrication and in the manufacture of pharmaceuticals, as well as to methods of producing stock for ion-exchange filters used in the production of pure water.

Polyolefinic high-molecular weight materials are considered to be suitable as polymeric substrates for radiation-induced graft polymerization. Among these, polyethylene is considered the best stock for radiation-induced graft polymerization. This is because polyethylene is easier to crosslink but more resistant to decay after exposure to radiation as compared to other polyolefinic materials. Polyethylene-based substrates for radiation-induced graft polymerization are well known in the form of film and hollow yarn, which are used as ion-exchange membranes, cell diaphragms, air purifying materials, affinity separating membranes, water treating materials, deodorants, etc. A case of producing a cell diaphragm using a film treated by radiation-induced graft polymerization is disclosed in YUASA JIHO, 54, 57–62 (1983) under the title "On Membranes Produced by Pre-irradiation Graft Polymerization". The use of shaped polymers as water treating materials is disclosed in Japanese Patent Public Disclosure Nos. 111685/1993 and 111637/1993.

Forming woven or non-woven fabrics from the fibers of polymers such as polyolefins and polyesters and using them as filter stock is a common practice; however, as far as the present inventors know, commercial use of polyethylene monofilament fiber as the raw material for filter stock in the form of a woven or non-woven fabric as a fiber aggregate has been very scarce. This is because the physical and chemical characteristics, such as the melting point and chemical resistance, of polyethylene are inferior to those of other polyolefinic materials typified by by polypropylene, so the use of polyethylene monofilament fiber has not drawn much attention as a candidate for filter stock. In fact, the polyethylene monofilament fiber has outstanding characteristics for radiation-induced graft polymerization and it can be processed into woven or non-woven fabrics, into which functional radicals are introduced by radiation-induced polymerization. However, the woven or non-woven fabric materials thus produced by radiation-induced graft polymerization do not have high enough physical strength, so they undergo permanent set strain, commonly called "failure", and are unable to maintain sufficient strength and dimensional stability to function as filter stock. As the result, considerable difficulty has been encountered in molding them into a pleated filter or the molded filter experiences increased pressure loss.

With a view to solving these problems, the present inventors proposed the production of fiber having improved separating capability by applying radiation-induced graft polymerization to a core/sheath composite fiber (Japanese Patent Public Disclosure No. 199480/1996). To make the proposed fiber having improved separating capability, a composite fiber using high-melting point polymers such as polyethylene (in the sheath) and polypropylene or polyethylene terephthalate (in the core) is employed as the substrate for grafting and this enables a thermal fusion method to be practiced at the stage of processing into a non-woven fabric. As a result, the physical strength of the core is combined with the force of adhesion created at the points of contact between individual filaments and the fiber exhibits a very significant physical strength.

A problem with this composite fiber is that graft polymerization occurs primarily in the sheath-forming polyethylene, so the sheath occasionally separates from the core after graft polymerization to create gaps, in which processing chemicals stay to induce deterioration of the fiber characteristics for the cleaning step in the manufacturing process. If an attempt is made to increase the graft ratio of the composite fiber taken as a whole, the graft ratio of the sheath increases so much that its breakdown occurs, though on rare occasions.

DISCLOSURE OF THE INVENTION

The present inventors conducted intensive studies with a view to enhancing the strength of the stock that was to be formed by applying a radiation-induced graft polymerization treatment to a substrate in the form of a woven or non-woven fabric composed of polyethylene monofilament fiber. As a result, it was found that when a substrate in the form of a woven or non-woven fabric composed of polyethylene monofilament fiber was combined with a reinforcement polymer having a greater strength and a slower rate of graft polymerization than the polyethylene monofilament fiber, the physical strength of the polyethylene woven or non-woven fabric material was enhanced; it was also found that by applying radiation-induced polymerization to said material, filter stock having improved capabilities and strength characteristics was produced. It was further found that this filter stock had outstanding advantages that were quite unexpected as will be set forth hereinafter.

Thus, according to its first aspect, the present invention relates to a polymer substrate for radiation-induced graft polymerization in the form of a woven or non-woven fabric that comprises a woven or non-woven fabric composed of polyethylene fiber and a reinforcement polymer having a greater strength and a slower rate of graft polymerization than said polyethylene fiber.

The invention also relates to filter stock that has functional radicals introduced into the substrate for radiation-induced graft polymerization according to the first aspect by radiation-induced graft polymerization.

BEST MODE FOR CARRYING OUT THE INVENTION

Figure 1:
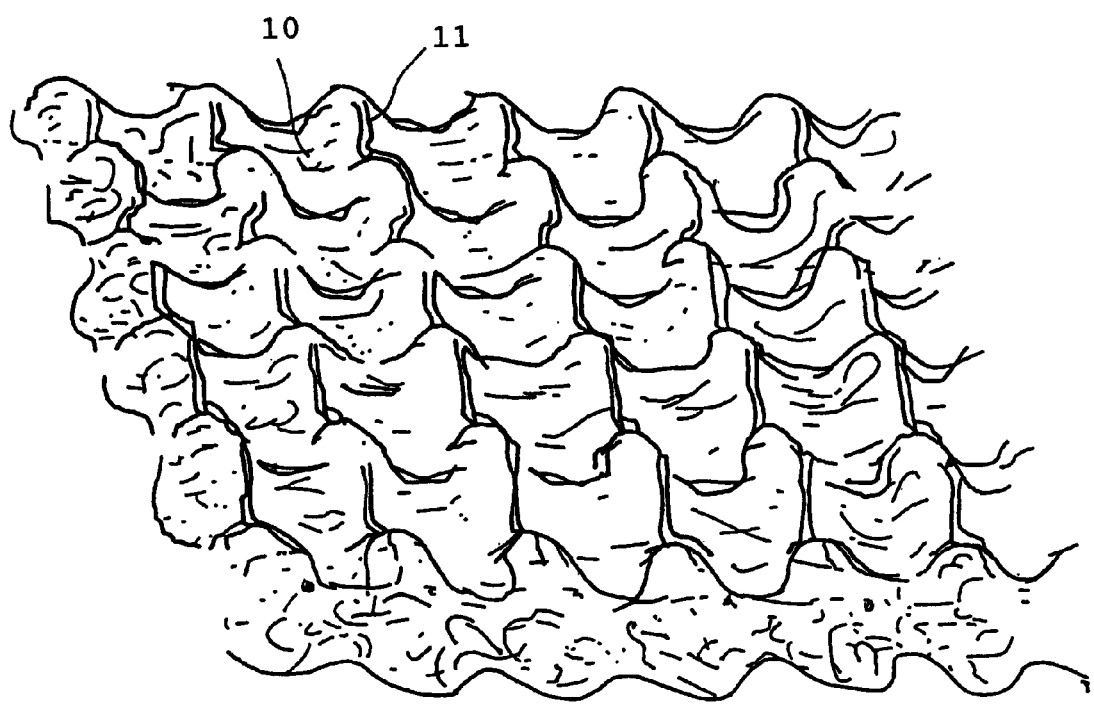
FIG. 1 is a perspective view showing the surface profile of the reinforced non-woven fabric material of the invention as subjected to radiation-induced graft polymerization.

On the pages that follow, we describe the unexpected advantages of the polymer substrate for radiation-induced graft polymerization according to the first aspect of the invention. When woven or non-woven fabrics which are a fiber aggregate are to be used as stock of filters for gases and liquids, filters are often produced by pleating the stock (i.e., folding the woven or non-woven fabric into pleats) in order to reduce pressure loss. In this case, a spacer is commonly inserted between sheets of the filter stock so that their distance is kept constant at peaks, at valleys and in the flat region between a peak and an adjacent valley. The spacer is commonly made of metal or plastics In order to keep a constant distance between the sheets of the filter stock, the spacer in most cases takes a wavy form and other regular arrangements of high and low spots.

In the case of chemical filters, it is very important that the woven or non-woven fabric be exposed to uniform face velocity. Speaking of the conventional filter used to reject fine particles, even if the flow velocity is not uniform, more of the fluid flows through high-velocity areas to get more of the fine particles trapped, whereupon an increased pressure loss occurs in those areas and the fluid flows toward the areas of smaller pressure loss; as a result, the flow velocity of the fluid becomes uniform by itself. On the other hand, the chemical filter has a gaseous component as the substance to be rejected and even if it is rejected, there will be no corresponding increase in pressure loss. Therefore, with chemical filters, utmost care has been exercised in spacer design in order to keep the face velocity constant.

This has unavoidably increased the number of high and low spots that serve to keep the distance between two woven or non woven fabric sheets constant. However, if the high and low spots of the spacer contact the adjacent woven or non-woven fabric sheet, air is unable to have access to the areas of contact and the effective filtration area of the filter decreases. In an extreme case, the non-effective filter ion area has exceeded 20% of the total area of the woven or non-woven fabric. Considering this point, it is often in the case of molding pleated filters that the woven or non-woven fabric is folded to produce more pleats than are required theoretically but this has only led to a higher production cost. The same problem exists with filters of a parallel-flow type.

If the woven or non-woven fabrics composed of polymer fiber are subjected to radiation-induced graft polymerization, they undergo dimensional changes in thickness, longitudinal and transverse directions. Since the substrate of the present invention is the combination of a woven or non-woven fabric composed of polyethylene fiber and a reinforcement polymer having a greater strength and a slower rate of graft polymerization than the polyethylene fiber, graft polymerization proceeds at different speeds in the fiber and reinforcement areas, causing; dimensional changes to occur at different ratios. As a result, the substrate acquires an undulated surface after graft polymerization.

Take, for example, the case where a substrate in the form of a polyethylene non-woven fabric is combined with a reinforcement polymer in the form of a polyethylene net that has a larger wire diameter (that is, having a greater strength and a slower rate of graft polymerization than the polyethylene of which the substrate non-woven fabric is composed) and which is fused to the substrate. Upon radiation-induced graft polymerization, the substrate acquires undulations on the surface as shown in FIG. 1, in which numeral 10 represents the fibrous non-woven fabric material and 11 represents the netting.

As will be described later in the section of Examples, a substrate non-woven fabric made of polyethylene fiber was intermeshed with polyethylene filaments of 100 d (denier) in two crossed directions (Example 1) or had a polyethylene net of a larger wire diameter than the polyethylene fiber fused to both sides of the non-woven fabric (Example 2). The two substrates were subjected to radiation-induced graft polymerization and their surface profiles are shown by micrograph in FIG. 2 (before grafting) and FIG. 3 (after grafting) for the case of Example 1 and in FIG. 4 (before grafting) and FIG. 5 (after grafting) for the case of Example 2. Obviously, the substrates according to the invention had undulations formed on the surface by application of graft polymerization.

Thus, the stock produced. by performing graft polymerization on the substrate non-woven fabric of the invention possesses undulations on the surface and by pleating it, pleats are formed in each sheet of filter stock such that their distance is kept constant without using a spacer. Therefore, if an ion-exchange chemical filter is fabricated by pleating the filter stock produced by graft polymerization in accordance with the invention, the distance between two filters is kept constant at peaks, at valleys and in the flat region between a peak and an adjacent valley to create a uniform flow velocity, enabling efficient consumption of the overall ion-exchange capacity of the filter assembly. In addition, since the step of inserting spacers is eliminated, the filter manufacturing process is simplified and made cost-effective. As a further advantage, graft polymerization has also occurred in the reinforcement area, though at small graft ratio. Therefore, both the substrate non-woven fabric and the reinforcement possess ion-exchange groups and the filter stock taken as a whole has an even greater gas adsorption capacity and, hence, a longer operating life. If some special measure is taken to secure the joining between the reinforcement and the polyethylene fiber, it also becomes possible to suppress the dislodging of fiber fragments from the woven or non-woven fabric.

The polyethylene monofilament fiber which is a component of the woven or non-woven fabric according to the invention has preferably a thickness that typically ranges from several to, several tens of deniers.

In the present invention, a polymer having a higher strength and a slower rate of radiation-induced graft polymerization than the polyethylene monofilament fiber which is a component of the woven or non-woven fabric, which is used as a reinforcement of said fabric and various types of reinforcements can be used for this purpose, including polyethylene yarns and yarn-like products thicker than the polyethylene fiber, as well as articles produced by processing them, as exemplified by sheeting such as nets and polyethylene films, and torn and perforated versions of sheeting. These reinforcements have larger wire diameters and smaller surface areas per unit weight than the polyethylene monofilament fiber which is a component of the woven or non-woven fabric and, hence, they are subject to slower radiation-induced graft polymerization.

Polymeric materials are generally known to deteriorate in physical strength when subjected to radiation-induced graft polymerization. However, speaking of the above-mentioned reinforcement polyethylene of the invention, it has a larger wire diameter than the polyethylene monofilament fiber of which the woven or non-woven fabric is made, so even at the end of the radiation-induced graft polymerization reaction, radiation-induced graft polymerization has not proceeded beyond the neighborhood of the surface of the reinforcement polyethylene and its physical strength will not be greatly impaired. Therefore, due to its combination with the reinforcement described above, the polyethylene material of the invention maintains its physical strength without experiencing substantial decrease after radiation-induced graft polymerization.

Various forms of reinforcement polyethylene can be composited with the polyethylene fiber and processed into reinforced woven or non-woven materials by several methods, and if the reinforcement is polyethylene yarns or yarn-like products, it is convenient to knit them into the woven or non-woven fabric made of the polyethylene monofilament fiber. If the reinforcement is a polyethylene film or net, it is conveniently bonded to the surface of the polyethylene woven or non-woven fabric. Thermal fusion is a preferred bonding method. It is also possible to form a non-woven fabric material by interlacing the net or film with the polyethylene fiber.

While various methods well known in the art may be used to produce the woven or non-woven fabric made of the polyethylene monofilament fiber, it is preferred to adopt methods that take special measures for keeping the fiber aggregate intact as by needle punching or embossing such as spot welding.

The foregoing description mainly concerns forming the woven or non-woven fabric of polyethylene fiber and combining it with the reinforcement polyethylene but it should be understood that the concept of the invention is also applicable to other polymeric materials. To be specific, polymer fibers other than the polyethylene fiber can be used to make the woven or non-woven fabric; in addition to or alternatively, the woven or non-woven fabric may be combined with reinforcement polymeric materials having greater strengths and slower rates of graft polymerization than the fibers of which the woven or non-woven fabric is made. When the substrate for graft polymerization that is made of this combination is subjected to radiation-induced graft polymerization, the woven or non-woven fabric portion and the reinforcement portion undergo grafting at different ratios and, hence, experience dimensional changes by different amounts as already explained in connection with the polyethylene material; thus, after the graft polymerization, the substrate similarly acquires undulations on the surface and can be pleated without using a separator. As for the reinforcement, it undergoes only a low degree of graft polymerization, so its strength will not be greatly impaired and this contributes to retaining the physical strength of the substrate.

Thus, according to its second aspect, the present invention relates to a polymer substrate for radiation-induced graft polymerization in the form of a woven or non-woven fabric that comprises a woven or non-woven fabric composed of polymer fiber and a reinforcement polymer having a greater strength and a slower rate of radiation-induced graft polymerization than said polymer fiber.

Speaking of the materials that can be used in the second aspect of the invention, the polymer fiber which composes the woven or non-woven fabric may be selected from among halogenated polyolefins such as polyvinyl chloride and polyvinyl fluoride, and the polymeric material which composes the reinforcement may be selected from among halogenated polyolefins, polyethylene terephthalate, polyurethane fiber, vinylon fiber, cellulose fiber and inorganic fibers such as glass fiber.

In the second aspect of the invention, various parameters of undulations that are formed upon application of graft polymerization to the substrate for graft polymerization, such as their height (the distance between pleats formed by pleating) and number, can be controlled by adjusting factors such as the graft ratios of the reinforcement and the substrate polymer fiber, the shape of the reinforcement, its areal density and thickness.

When forming the substrate woven or non-woven fabric from the polymer fiber, another polymer fiber having a slower rate of radiation-induced graft polymerization than said polymer fiber may also be used and combined with said polymer fiber to form the substrate woven or non-woven fabric and this is another effective way to enhance the strength of the substrate woven or non-woven fabric after radiation-induced graft polymerization. For example, polyethylene fiber and polyethylene terephthalate fiber (which is known to be little reactive in radiation grafting) may be mixed at a ratio of about 80:20 to form a non-woven fabric, thereby producing the substrate for radiation-induced graft polymerization. In this substrate, the polyethylene fiber and the polyethylene terephthalate fiber are randomly interlaced and when it is subjected to radiation-induced graft polymerization reaction, only the polyethylene part of the interlaced fibers undergoes the graft reaction and the polyethylene terephthalate fiber remains almost unreacted. Hence, the strength of the substrate non-woven fabric is retained by the polyethylene terephthalate fiber in which no graft reaction has occurred. In this case, however, the polyethylene fiber and the polyethylene terephthalate fiber are arranged randomly (i.e., uniformly), so the substrate acquires only few undulations after the radiation-induced graft polymerization reaction and if it is to be used as a pleated filter, a spacer has to be inserted between two filters as is conventionally the case.

Thus, according to its third aspect, the present invention relates to a polymer substrate for radiation-induced graft polymerization in the form of a woven or non-woven fabric which is formed by mixing polymer fiber with another polymer fiber having a slower rate of radiation-induced graft polymerization than said polymer fiber.

Speaking of the materials that can be used in the third aspect of the invention, the polymer fiber may be selected from among polyethylene and halogenated polyolefins such as polyvinyl chloride and polyvinyl fluoride, and the "another polymer fiber" having a slower rate of radiation-induced graft polymerization may be selected from among halogenated polyolefins, polyethylene terephthalate, polyurethane fiber, vinylon fiber, cellulose fiber and inorganic fibers such as glass fiber. Two or more of these fibers may be used as the "another polymer fiber".

The present inventors continued their studies in order to find another technique for enhancing the strength of the substrate for radiation grafting which was formed of a woven or non-woven fabric of polyethylene fiber. As a result, they found that by performing a radiation-induced graft polymerization treatment on the woven or non-woven fabric of polyethylene fiber in such a way that the graft reaction would occur only in the surface of the fiber whereas its center would remain unaffected by the graft reaction, filter stock of high physical strength in the form of a radiation graft treated woven or non-woven fabric could be provided using the polyethylene monofilament fiber heretofore considered difficult to utilize.

Thus, according to its fourth aspect, the present invention relates to a radiation graft treated material in the form of a woven or non-woven fabric material that is composed of polyethylene monofilament fiber of which only the surface has undergone radiation-induced graft polymerization but of which the center remains unaffected by grafting.

Radiation-induced graft polymerization is generally performed in order to introduce functional radicals such as ion-exchange groups into substrates, so one of the general design considerations in the art is that from the viewpoint of increasing the density of radicals in the substrate by introducing as many functional radicals as possible, graft polymerization desirably proceeds deeper into the bulk of the substrate. On the other hand, it is known that the physical strength of polymeric materials decreases if it is subjected to a radiation-induced graft polymerization treatment. Particularly in the case of introducing hydrophilic groups such as ion-exchange groups into the substrate by means of radiation-induced graft polymerization, water is attracted by the ion-exchange groups and the physical strength of the substrate becomes considerably lower than before grafting was performed.

In the radiation graft treated stock according to the fourth aspect of the invention, graft polymerization has occurred only in the surface of a fiber cross section and no grafting has occurred in the center, so the fiber center which remains unaffected by grafting maintains the pre-grafting value of physical strength. Hence, one can produce fiber stock into which functional radicals have been introduced by means of radiation-induced graft polymerization without greatly deteriorating the physical strength of the fiber taken as a whole. In the radiation graft treated material according to the fourth aspect of the invention, the center of the fiber which remains unaffected by grafting performs the function of maintaining physical strength whereas the surface of the fiber which has undergone graft polymerization performs an added function such as an ion-exchange capability that has been imparted by graft polymerization.

Thus, according to the fourth aspect of the invention, one can maintain high levels of physical strength that have been considered unattainable by the conventional radiation graft treatment and radiation graft treated materials having outstanding physical strength and high graft ratio can be produced using substrate woven or non-woven fabrics made of polyethylene monofilament fiber which have heretofore been unsuitable for use as the substrate for radiation-induced graft polymerization on account of difficulties such as low fiber strength and the occurrence of failure.

According to the fourth aspect of the invention, only the surface of the fiber "has undergone radiation-induced graft polymerization", and this means that not all of the fiber cross section has undergone grafting but an area that has been unaffected by grafting remains in the center of the fiber cross section. If the proportion of the area unaffected by grafting is high, the graft treated fiber stock has high strength but the overall graft ratio is low. Conversely, if the proportion of the area unaffected by grafting is low, high graft ratio is achieved but the graft treated fiber stock has low strength. The depth of grafting depends on the intended use of the stock and is determined by the balance between the desired values of graft ratio and stock's strength. Typically, fiber stock that has been affected by grafting in an area extending from the fiber surface down to a point in its interior between $\frac{1}{3}$ and $\frac{2}{3}$ of its thickness is preferred from the viewpoint of attaining a balance that can maintain high strength while achieving high graft ratio.

Allowing the radiation-induced graft polymerization reaction to proceed such that grafting occurs only in the surface of the substrate fiber but that its center remains unaffected by grafting and determining the depth of grafting are tasks the skilled artisan can accomplish empirically by appropriately choosing various parameters such as for example, the kind of the substrate fiber, its size, the method of irradiation, its intensity, its duration, the method of graft polymerization reaction and the conditions therefor.

Polyethylenes are classified by production process into two types, the low-density polyethylene and the high-density polyethylene. Low-density polyethylenes have smaller degrees of crystallization between 50 and 60% and contain such a large portion of the amorphous state that during the graft reaction, monomers diffuse at a high enough rate to increase the likelihood of graft polymerization to proceed into the fiber's interior. In contrast, high-density polyethylenes having specific gravities greater than 0.94 present larger degrees of crystallization between 80 and 90% and contain such a small portion of the amorphous state that they are favorable to the purpose of ensuring that the graft reaction will occur only in the fiber surface and nearby areas and will not proceed deeper into the interior. Further, high-density polyethylenes permit the generation of many radicals in the crystal that can be utilized in the graft reaction so that they offers advantages such as increased strength after graft polymerization and higher ultimate graft ratio. Hence, he high-density polyethylene is highly suitable for use as the substrate in producing the radiation graft treated stock of the invention.

Again, the technical concept for the fourth aspect of the invention is applicable not only to the stock based on the, woven or non-woven fabric made of polyethylene monofilament fiber but also to other polymeric materials. Thus, according to its fifth aspect, the present invention relates to a radiation graft treated material in the form of a woven or non-woven fabric material that is composed of polymer monofilament fiber of which only the surface has undergone radiation-induced graft polymerization but of which the center remains unaffected by grafting. Examples of the substrate fiber that can be used in the fifth aspect of the invention to compose the woven or non-woven fabric material include not only polyethylene but also halogenated polyolefins such as polyvinyl chloride and polyvinyl fluoride.

The substrate for graft polymerization according to the present invention can be subjected to radiation-induced graft polymerization by two methods, the pre-irradiation process in which the substrate is first irradiated and then brought into contact with a polymerizable monomer and the simultaneous irradiation process in which the substrate is irradiated in the presence of a polymerizable monomer. Either method can be adopted in the present invention.

The methods of graft polymerization may be classified as follows by the manner in which the polymerizable monomer is brought into contact with the substrate. The method in which the irradiated substrate is kept immersed in the monomer solution as it is subjected to graft polymerization is call ed "liquid-phase graft polymerization" and in this case, the reaction temperature and time are preferably within the ranges of 20–60° C. and 2–10 hours, respectively. The liquid-phase graft polymerization process is capable of uniform graft polymerization but has the problem of consuming large amounts of processing chemicals.

The method in which the irradiated substrate is brought into contact with the monomer vapor is called "vapor-phase graft polymerization". While this method is only applicable to monomers having comparatively high vapor pressures and has high likelihood for causing uneven grafting it has the advantage of allowing the substrate to be obtained in a dry state after graft polymerization. In this case, the reaction temperature and time are preferably within the ranges of 20–80° C. and 2–10 hours, respectively.

Either of the polymerization methods described above can be applied to implement the present invention.

The method in which a specified amount of monomer is imparted to the irradiated substrate and reaction is performed in vacuum or an inert gas to effect graft polymerization is called "impregnation graft polymerization"; in this case, the reaction temperature and time are preferably within the ranges of 20–60° C. and 0.2–8 hours, respectively. The impregnation graft polymerization process is economical since almost all monomers used undergo the reaction and very little of the processing chemicals remain unreacted. In addition, the substrate is obtained in a dry state after graft polymerization, giving advantages such as the ease of handling the substrate and smaller emission of liquid wastes. This method is particularly effective in the case where porous materials such as woven and non-woven fabrics are used as the substrate for grafting.

For the reason to be mentioned below, the impregnation graft polymerization process is very effective if it is especially used in the fourth and fifth aspects of the invention. In impregnation graft polymerization, the irradiated substrate having radicals is contacted by a monomer, to initiate the polymerization reaction and as it progresses, the radicals move from the irradiated substrate onto the monomer which then starts to polymerize by itself. Because of this phenomenon, as the stage of reaction proceeds into the second half, the monomer grows in molecular weight and presents difficulty in impregnating or otherwise getting into the substrate fiber, thereby increasing the chance of ensuring that the graft reaction will not go deeper than the surface of the substrate fiber. On the other hand, the liquid-phase graft polymerization process uses by far larger amounts of monomers than the substrate and they remain unreacted in high proportions even in the second half of the reaction and will diffuse or permeate into the bulk of the fiber; therefore, in order to obtain graft treated stock in which only the surface of the fiber has undergone radiation-induced graft polymerization according to the fourth and fifth aspects of the invention, process conditions such as the time and temperature for the graft reaction need be controlled positively.

Generally speaking, it is preferred that the polyethylene monofilament fiber used in the invention as a component of the substrate in the form of a woven or non-woven fabric has a fineness from several to several tens of deniers.

While various methods well known in the art may be employed to prepare the woven and non-woven fabrics for use as the substrate for grafting in the present invention, it is preferred to adopt methods that take various measures to prevent disintegration of the fiber aggregate as by needle punching or embossing such as spot welding.

The polymerizable monomer to be introduced into the substrate by radiation-induced graft polymerization is one having various functional radicals in itself or another that is first grafted to the substrate and then subjected to a secondary reaction to thereby introduce functional radicals.

Consider, for example, the case of producing ion-exchange filter stock by the present invention. Using monomers having ion-exchange groups such as acrylic acid, methacrylic acid, sodium methylenesulfonate, sodium metallylsulfonate, sodium allylsulfonate and vinylbenzyl trimethyl ammonium chloride, radiation-induced graft polymerization may be performed so that functional radicals are directly introduced into the substrate fiber, thereby producing ion-exchange filter stock.

Examples of the monomer that is first subjected to radiation-induced graft polymerization and then to a secondary reaction to introduce ion-exchange groups include acrylonitrile, acrolein, vinylpyridine, styrene, chloromethylstyrene and glycidyl methacrylate. In an exemplary case, glycidyl methacrylate is introduced into the substrate non-woven fabric by radiation grafting and then reacted with a sulfonating agent such as sodium sulfite to introduce sulfone groups, thereby producing ion-exchange fiber. If desired, an amino-introducing compound such as diethanolamine may be used in combination with glycidyl methacrylate to introduce ion-exchange groups such as quaternary ammonium and a tertiary amino group.

Primary applications of the present invention include a method for producing ion-exchange filter stock; the invention finds use in other applications such as heavy metal adsorbents having a chelate group, catalysts, affinity chromatographic carriers, etc.

It should be noted that one of the above-described first to third aspects of the invention can be combined with the fourth or fifth aspect. To be more specific, a polymer substrate for radiation-induced graft polymerization in the form of a woven or non-woven fabric that comprises a woven or non-woven fabric composed of polymer fiber and a reinforcement polymer having a greater strength and a slower rate of radiation-induced graft polymerization than said polymer fiber or a polymer substrate for radiation-induced graft polymerization in the form of a woven or non-woven fabric which is formed by mixing polymer fiber with another polymer fiber having a slower rate of radiation-induced graft polymerization than said polymer fiber is subjected to radiation-induced graft polymerization reaction such that only the surface of the polymer fiber undergoes radiation grafting to produce a radiation graft treated material of improved strength.

The present inventors also found a very effective method for performing radiation-induced graft polymerization on woven or non-woven fabric materials. Details are given below.

As already mentioned, methods of radiation-induced graft polymerization are classified into simultaneous irradiation graft polymerization and pre-irradiation graft polymerization. While both methods can be commercialized, the pre-irradiation method yields less homopolymer as the result of polymerization of the monomer to be grafted and is suitable for use in water treatments to produce materials for the production of pure water or in gas treatments to produce materials for air purification or production of clean air.

The pre-irradiation graft polymerization methods are classified into liquid-phase graft polymerization and gas-phase graft polymerization depending on whether the monomer to be brought into contact with the irradiated substrate is liquid or gas. Gas-phase graft polymerization uses less monomer and is economical; on the other hand, it is only applicable to monomers of high vapor pressure and uneven grafting tends to occur in the product. These problems are absent from liquid-phase graft polymerization, which is applicable to a broad range of monomers and, hence, is a general-purpose method.

However, if a highly porous substrate such as a woven or non-woven fabric is to be subjected to pre-irradiation liquid-phase graft polymerization, uniform grafting in high graft ratio is difficult to achieve and the product of graft polymerization does not have the desired physical stability unless the oxygen trapped in the pores in the substrate is adequately removed during irradiation or graft polymerization reaction. What is more, a large amount of cleaning chemical must be used after graft polymerization to wash off the unwanted monomer trapped in the pores in the substrate and the treatment of the resulting liquid waste is very costly.

As a method of solving these problems, the present inventors proposed a new approach of graft polymerization in Patent No. 1933644. It is a method of radiation-induced graft polymerization characterized by separating irradiation and graft polymerization reaction such that a pre-irradiated substrate is impregnated with a specified amount of monomer solution and placed under vacuum to remove the residual oxygen before graft polymerization reaction is performed in a gas phase under vacuum. In this method, the monomer solution adhering to the substrate serves as a source of monomer vapor in the gas-phase graft reaction, the product of grafting can be finished in a dry state and the graft ratio can be easily controlled. For these and other features, the method was a unique technology possessing the advantages of both the liquid-phase and gas-phase graft polymerization methods. What is more, since the step of irradiation is separated from the step of graft polymerization reaction, the performer of graft polymerization reaction need not possess a source of irradiation for himself and this renders the patented method suitable for small-lot production.

This method, however, has had the following problems. The distribution of radicals generated in the substrate by irradiation depends on the energy of radiation being applied but it is generally uniform in the substrate. If irradiation is performed in a separate step from graft polymerization reaction, the radicals in the non-crystalline area disappear and only the radicals generated in the crystals are utilized in the graft polymerization reaction. Therefore, the efficiency of radical utilization is small and high radiation exposure has been necessary to achieve satisfactory graft ratio.

In addition, if the interval from irradiation to graft polymerization reaction increases, oxygen may leak from the container of the irradiated substrate depending on the constituent material of which it is made and this increases the chance of radicals to decrease in number or deteriorate in quality. As a further problem, the stage of transition from the storage of the irradiated substrate to the graft polymerization reaction requires a lot of manpower in operations such as the recovery of the irradiated substrate from its container and replacement and installation of the recovered substrate onto the reactor; in addition, the substrate becomes exposed to air during the transition, again increasing the chance of decrease and deterioration of radicals.

In graft polymerization, the progress of the reaction is more adversely affected by the presence of oxygen than in the step of irradiation, so oxygen must be removed from the substrate once exposed to air. In order to achieve adequate removal of the oxygen trapped into the pores in the substrate, the step of evacuation has been necessary. Hence, the graft polymerization reactor must be a closed vessel comparable to vacuum chambers and this has been a major obstacle to the effort to implement a continuous treatment process.

Under these circumstances, a strong need has been felt to develop a method by which a long web of woven or non-woven fabric material can be subjected to a radiation-induced graft polymerization treatment continuously in a large volume.

As a result of the intensive studies made to develop a method capable of solving the above-mentioned problems, the present inventors found that substrates, in particular, long webs of woven or non-woven fabric materials could be subjected to efficient radiation-induced graft polymerization by ensuring that exposure of the substrate to electron beams, impregnation of the irradiated substrate with a monomer and graft polymerization reaction would be performed continuously in a nitrogen atmosphere. Thus, according to its sixth aspect, the present invention relates to a method for performing radiation-induced graft polymerization on substrates in the form of long webs of woven or non-woven fabric, comprising the steps of exposing a substrate in the form of a woven or non-woven fabric as a fiber aggregate to electron beams in a nitrogen atmosphere, contacting the irradiated substrate with a specified amount of monomer in a nitrogen atmosphere, and subjecting the monomer and the substrate in mutual contact to graft polymerization in a nitrogen atmosphere, said first through third steps being performed in succession. If desired, said first step is preferably preceded by a preliminary step of replacing the air in the substrate with nitrogen gas.

Electron beams are a preferred example of the radiation source to be employed in the sixth aspect of the invention. If γ-rays are to be used, a roll of substrate in the form of a woven or non-woven fabric is placed on an irradiation platform and irradiated with y-rays under cooling. However, this operation requires a lot of manpower and the substrate that can be treated per batch can be no longer than several hundred meters. In exposure to electron beams, the radiation has a small penetrating power but its dose rate is sufficiently large that the woven or non-woven fabric can be unrolled, irradiated and rewound at fast speed. Since no problems occur if the length of the substrate is further increased, the exposure to electron beams is suitable for high-volume production.

In the sixth aspect of the invention, the preferred conditions for exposure to electron beams are a voltage in the range of 100 keV–500 keV, an electron beam current in the range of 3 mA–50 mA, and an exposure in the range of 30 kGy–200 kGy. If the indicated parameters are within these ranges, radicals are uniformly generated on both sides of ordinary woven or non-woven fabrics and the substrate can be transported at a high enough speed to enable high-volume production.

In the method according to the sixth aspect of the invention, the step of irradiation is continuous to the step of graft polymerization reaction, so the radicals generated by irradiation can be utilized in the graft reaction before they disappear. Therefore, the required exposure, or dose of irradiation, can be reduced to ¼–⅐ of the conventionally required value.

In the sixth aspect of the invention, a nitrogen atmosphere for irradiation can be established by various methods well known in the art and introducing liquid nitrogen into the system is a preferred method since it fulfills two functions simultaneously, removal of oxygen and prevention of temperature elevation during irradiation. The temperature of the substrate being exposed to electron beams depends on substrate shape and the interval between the exposure and the graft polymerization reaction and it is generally preferred to lie between −50° C. and +50° C. According to the method of the invention, the irradiated substrate is not exposed to air at any point of the time prior to graft polymerization, so the amount of oxygen that may enter the substrate can be reduced to the least possible level. In addition, there is no need to use a closed vessel ass the graft polymerization reactor and evacuate it; this enables the overall treatment process to be performed continuously.

In the method according to the sixth aspect of the invention, the oxygen present in the substrate in the form of a woven or non-woven fabric must be removed before irradiation and to this end, nitrogen replacement is preferably performed as a preliminary step. The oxygen in the substrate can also be removed by blowing nitrogen against the substrate during the step of irradiation and, if this is done, the preliminary step of nitrogen replacement can be obviated. However, in order to apply the method of the invention to various shapes of the substrate in the form of a woven or non-woven fabric, it is preferred to include the preliminary step of nitrogen replacement.

Nitrogen replacement can be accomplished by a process consisting of evacuating the system and introducing nitrogen into it. The number of times this process is performed can be determined by various factors including the shape and length of the substrate to be treated. In the preliminary step of nitrogen replacement, evacuation is preferably performed within a closed vessel but due to the absence of the need to control the oxygen concentration as strictly as in the graft polymerization reaction, providing a chamber capable of maintaining a constant vacuum state in the continuous apparatus will suffice. By performing the process of evacuation and nitrogen introduction in several cycles, the concentration of oxygen in the pores in the substrate can easily be reduced to the desired level and below. The degree of vacuum that is necessary to achieve adequate nitrogen replacement in the method of the invention and the amount of nitrogen that need be introduced for this purpose vary greatly with the shape of the substrate, its constituent material, the speed at which it is transported and other factors; generally speaking, nitrogen replacement can be accomplished by evacuating the system to 20–30 mmHg and then introducing nitrogen into the system until its pressure becomes equal to one atmosphere. This process may be performed twice or three times in order to further lower the oxygen concentration in the system.

In the method according to the sixth aspect of the invention, the second step of bringing the substrate into contact with a specified amount of monomer is provided between the step of irradiation and the step of graft polymerization reaction. This second step is for ensuring that a monomer in the amount used by the graft polymerization reaction is preliminarily imparted to the irradiate substrate. In this second step, the monomer in excess of the amount used by the graft polymerization reaction is removed from the substrate, thus eliminating the need to remove the excess monomer from the substrate after the graft polymerization reaction ends. In the conventional method in which the irradiated substrate is subjected to liquid-phase graft polymerization as it is immersed in a monomer solution, the graft ratio has been controlled by reaction temperature and time. According to the method of the invention, the amount of the monomer to be imparted to the substrate is controlled, so compared to the method of control that solely depends on reaction temperature and time, the graft ratio can be controlled in a more consistent manner.

The substrate can be brought into contact with a specified amount of monomer by various methods known in the art. If a longer product life is preferred as in the case where the product is used as a chemical filter, high graft ratio is preferred and this end can conveniently be met by immersing the substrate in the monomer solution. However, if the substrate is immersed in the monomer solution and later recovered, the monomer solution deposited is at least five times as heavy as the substrate and "sag" will occur. In order to bring a specified amount of monomer into contact with the substrate in the method of the invention, an excess monomer solution has to be squeezed off, for example, with rollers. Of course, any other methods well known in the art may be used to remove the excess monomer solution.

The substrate to which the specified amount of monomer has been imparted is then subjected to the step of graft polymerization. In the method of the invention, graft polymerization is performed by heating the monomer-impregnated substrate to a graft polymerization temperature between 20 and 80° C. in a nitrogen atmosphere. In order to attain high graft ratio within a short time, the oxygen concentration in the reaction atmosphere is desirably maintained at 1000 ppm or below although its exact value depends on the graft polymerization reaction temperature. The oxygen concentration, the dose of radiation and the graft polymerization reaction temperature may be adjusted as appropriate to attain a specified reaction rate and ultimate graft ratio. In the present invention, the substrate is generally. heated at a graft polymerization temperature within the stated range for 5 minutes to 5 hours, preferably for 5 minutes to 1 hour, most preferably for 10 minutes to 30 minutes, thereby allowing the graft polymerization reaction to proceed.

Figure 6:
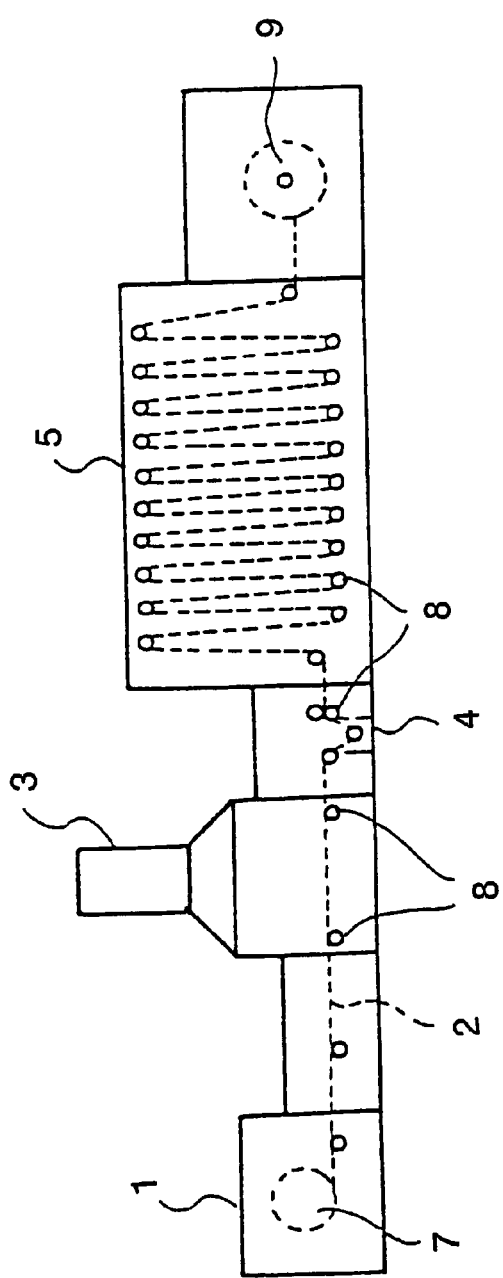
FIG. 6 shows in conceptual form an apparatus for a continuous radiation-induced graft polymerization treatment that is used to implement the method according to the sixth aspect of the present invention.

FIG. 6 shows in conceptual form an apparatus for implementing the method according to the sixth aspect of the invention. The apparatus consists of a series arrangement of the following units: a nitrogen replacement vessel 1 for replacing the air in the substrate woven or non-woven fabric by nitrogen gas; an electron beam exposing unit 3 for applying electron beams to the substrate in a nitrogen atmosphere; a monomer impregnating vessel 4 for bringing the irradiated substrate into contact with a monomer in a nitrogen atmosphere; and a graft polymerization vessel 5 for grafting the monomer onto the substrate in a nitrogen atmosphere. A roll of the substrate 2 in the form of a woven or non-woven fabric is unwound and passed through those units in succession and after the graft polymerization treatment ends, the substrate is rewound into a roll. To perform these operations, a sheeting transfer means is provided in the apparatus and it consists of a sheet unwinder 7, sheet transport rolls 8 and a sheet rewinder 9. As already mentioned, the step of nitrogen replacement can be omitted and if this is the case, the nitrogen replacement vessel 1 is dispensed with.

In the apparatus for continuous treatment of the substrate in long web form which is used in the invention, the long web of substrate is transported through the apparatus at a suitable speed so that it is subjected to a continuous treatment in successive steps. The suitable transport speed is generally in the range of 1–20 m/min, preferably 2–15 m/min, most preferably 2–10 m/min.

Examples of the substrate that can be subjected to radiation-induced graft polymerization treatment by the method according to the sixth aspect of the invention include long web materials such as woven fabrics, non-woven fabrics and foams that are typically made of polyolefins such as polyethylene and polypropylene or halogenated polyolefins such as polyvinyl chloride.

In the method according to the sixth aspect of the invention, a long web sheet of woven or non-woven fabric that is to be subjected to radiation-induced graft polymerization treatment (i.e., a long web sheet for radiation-induced graft polymerization) may be installed as such in a reaction apparatus of the type shown in FIG. 6 but in this case, both the leading and trailing end portions of the long web sheet remain unreacted after subsequent treatments. First, consider the case where a long web sheet is mounted in the reaction apparatus shown in FIG. 6, the respective steps of the method are adjusted to have the necessary reaction conditions and reaction is carried out as the long web sheet is rewound by the take-up roll 9. In this case, not all of the long web sheet that was initially mounted in the reaction apparatus is subjected to the entire process of the radiation-induced graft polymerization reaction but that part of the long web sheet which lied beyond the irradiation zone 3 at the start of operation remains unreacted although it is eventually taken up by the roll 9. Next, consider the case of treating two or more rolls of long web sheet continuously, with a subsequent roll being mounted after the treatment of a preceding roll. If reaction is resumed after the trailing end of the preceding long web is joined to the leading end of the subsequent long web sheet, no part of the joint will remain unreacted. However, in the case of stopping the reaction apparatus after all rolls have been treated, the whole sheet of the last roll is unwound from the sheet unwinder 7, the reaction apparatus is switched off and then all sheeting is rewound by the take-up roll 9. Hence, that part of the long web sheet which lied beyond the polymerization reaction zone 5 at system shutdown is again taken up by the roll 9 without having been subjected to the entire process of the radiation-induced graft polymerization reaction. In short, the trailing and leading end portions of long web sheets for radiation-induced graft polymerization remain unreacted and must be cut off before the treated long webs are used as filter stock but then the product yield lowers. Consider, for example, the case where 500-m long rolls of long web sheet for radiation-induced graft polymerization are passed through a reaction apparatus 50 m long. That part of the sheet of the first roll which is 50 m long as measured from its leading end and that part of the sheet of the last roll which is 50 m long from its trailing end are both rewound without passing through the entire reaction process and should be rejected as defectives.

One method of solving these problems would be by using a transport long web material (dummy sheet) that is as long as or slightly longer than the reaction apparatus. Such a dummy sheet is mounted over the transport line through the reaction apparatus, with its leading end being mounted on the take-up roll 9 and its trailing end positioned in the nitrogen replacement vessel 1. Then, a roll of long web sheet for radiation-induced graft polymerization is set on the sheet unwinder 7 and its leading end is joined to the trailing end of the dummy sheet within the nitrogen replacement vessel 1. Thereafter, the respective steps in the reaction apparatus are adjusted to have the necessary reaction conditions and the dummy sheet is rewound by the take-up roll 9, whereupon the long web sheet for radiation-induced graft polymerization progresses through the reaction apparatus. This approach ensures that all part of the long web sheet for radiation-induced graft polymerization including its leading end can be subjected to the whole process of the radiation-induced graft polymerization reaction. If desired, another dummy sheet may be joined to the trailing end of the long web sheet for radiation-induced graft polymerization; in this case, all part of the long web sheet for radiation-induced graft polymerization can be subjected to the whole process of the radiation-induced graft polymerization reaction and taken up by the roll 9; then, the reaction apparatus is turned off and the long web sheet that has been taken up after the radiation-induced graft polymerization treatment is cut off from the dummy sheet and taken out of the reaction apparatus. In the next place, the leading end of the dummy sheet left in the reaction apparatus is mounted on the take-up roll 9 and a small amount of it is rewound by the take-up roll 9 until its trailing end portion is positioned within the nitrogen replacement vessel 1; subsequently, another roll of long web sheet for radiation-induced graft polymerization is set on the sheet unwinder 7 and the above-described procedure is repeated by joining its leading end to the trailing end of the dummy sheet, adjusting the respective steps in the reaction apparatus to have the necessary reaction conditions and turning the take-up roll 9, whereupon all part of the long web sheet can be subjected to the whole process of the radiation-induced graft polymerization treatment. As another advantage, this approach eliminates the need to mount a long web sheet over the entire transport line in the reaction apparatus each time roll replacement is done and. this leads to substantial reduction of manpower.

Examples of the transport long web sheet (dummy sheet) that can be used for the purposes described above include nonporous films, nets, as well as woven and non-woven fabrics that are made from halogenated polyolefins, polyethylene terephthalate, polyurethane fiber, vinylon fiber, cellulose fiber and inorganic fibers such as glass fiber.

Figure 7:
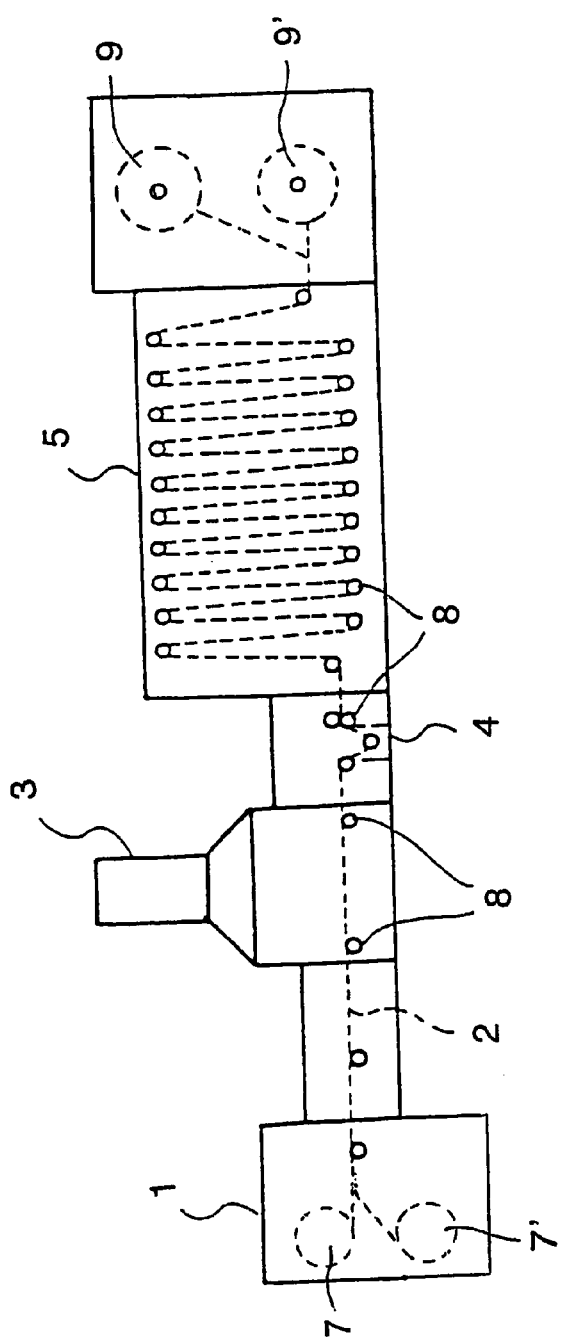
FIG. 7 shows in conceptual form another example of the apparatus for a continuous radiation-induced graft polymerization treatment.

In the method according to the sixth aspect of the invention, the radiation-induced graft polymerization treatment can be performed using long webs of woven or non-woven fabrics made of ordinary polymer monofilament fiber. A problem with this case is that the substrate fiber is embrittled by graft reaction and the long web of woven or non-woven fabrics may potentially rupture while it is being transported through the reaction apparatus by the rewinding action of the take-up roll. This problem can be solved by joining the substrate in the form of a long web sheet of woven or non-woven fabric to a sheet transport support material (transport sheet) equal in length to the substrate and then rewinding the two sheets together by means of the take-up roll so as to transport the substrate through the reaction apparatus. Using the transport sheet, one can avoid difficulties such as rupture in the substrate due to the take-up tension of the roll and it can be rewound under a reasonably strong force without considering its strength. An exemplary method of implementing this approach is shown in FIG. 7; a roll 7 of substrate in the form of a long web sheet of woven or non-woven fabric and a roll 7' of transport sheet equal in length to the substrate are joined within the nitrogen replacement vessel 1 and transported along the line within the reaction apparatus to pass through the graft reaction vessel 5; then, the substrate and the transport sheet are separated from each other and rewound by the take-up rolls 9 and 9', respectively.

Examples of the sheet transporting support material (transport sheet) that can be used for the purpose described above include nets, films, as well as woven and non-woven fabrics that are made from halogenated polyolefins, polyethylene terephthalate, polyurethane fiber, vinylon fiber, cellulose fiber and inorganic fibers such as glass fiber.

If desired, the woven or non-woven fabric material in combination with a reinforcement according to the first and second aspects of the invention or the woven or non-woven fabric material composed of mixed polymer fibers according to the third aspect of the invention may be used as the long web sheet which is to be subjected to a radiation-induced graft polymerization treatment by the method according to the sixth aspect of the invention. Alternatively, in the process of radiation-induced graft polymerization treatment according to the sixth aspect of the invention, a monomer may be grafted only to the fiber surface according to the fourth and fifth aspects of the invention. In either way, the strength of the woven or non-woven fabric material is retained to secure the strength of the fiber itself, thereby solving problems such as the above-mentioned rupture in the substrate sheet due to the tension of the take-up roll. Other problems that can be solved are those originating from monomer grafting onto the substrate such as the tendency of the fiber to be easily dislodged from the embrittled substrate and the substantial decrease in the size of that substrate.

Thus, according to its seventh aspect, the present invention relates to a method for performing radiation-induced graft polymerization on substrates in the form of a woven or non-woven fabric, comprising the steps of exposing a substrate in the form of a woven or non-woven fabric to electron beams in a nitrogen atmosphere, contacting the irradiated substrate with a specified amount of monomer in a nitrogen atmosphere, and subjecting the monomer and the substrate in mutual contact to graft polymerization in a nitrogen atmosphere, said first through third steps being performed in succession, characterized in that the substrate in the form of a woven or non-woven fabric is a polymer substrate for radiation-induced graft polymerization in the form of a woven or non-woven fabric that comprises a woven or non-woven fabric composed of polymer fiber and a reinforcement polymer having a greater strength and a slower rate of radiation-induced graft polymerization than said polymer fiber or a polymer substrate for radiation-induced graft polymerization in the form of a woven or non-woven fabric which is formed by mixing polymer fiber with another polymer fiber having a slower rate of radiation-induced graft polymerization than said polymer fiber. Further, according to its eighth aspect, the present invention relates to a method for performing radiation-induced graft polymerization on substrates in the form of a woven or non-woven fabric, comprising the steps of exposing a substrate in the form of a woven or non-woven fabric composed of polymer fiber to electron beams in a nitrogen atmosphere, contacting the irradiated substrate with a specified amount of monomer in a nitrogen atmosphere, and subjecting the monomer and the substrate in mutual contact to graft polymerization in a nitrogen atmosphere, said first through third steps being performed in succession, characterized in that radiation-induced graft polymerization reaction is performed under such conditions that only the surface of said polymer fiber undergoes radiation-induced graft polymerization whereas no monomer is grafted onto the center of the polymer fiber.

INDUSTRIAL APPLICABILITY

According to the present invention, woven or non-woven fabrics of polyethylene which have heretofore found only limited use can be employed to produce substrates for polyethylene graft polymerization that show outstanding characteristics.

In the first and second aspects of the invention, the introduction of a reinforcement contributes to increasing the strength of the woven or non-woven fabric itself. What is more, the strength of the woven or non-woven fabric will not decrease in any of the steps of graft polymerization reaction, ion-exchange group introducing reaction and filter shaping and processing, thereby eliminating the possibility that the woven or non-woven fabric material will break or perform poorly in these steps. If the substrate for graft polymerization according to the first aspect of the invention is subjected to graft polymerization, undulations occur in the surface of the substrate making it suitable for use as filter stock that can be pleated or otherwise shaped into filters. In the case of pleating, the distance between pleats can be held constant without using separators that have no adsorbing capability on their own but which simply reduce the effective filtration area of the filter. In addition, graft polymerization also occurs in the reinforcement to introduce functional radicals there and this contributes to a further improvement in the capabilities of the filter assembly. Using no separators, the filter assembly is lighter in weight. The process of filter production is made simple enough to realize cost reduction.

In the fourth aspect of the invention, graft treated polyethylene materials having improved physical strength and high graft ratio can be produced using polyethylene fiber in the form of a woven or non-woven fabric but without using reinforcements. The concept of the invention can be applied to a broad range of other polymer materials to produce graft treated polymer materials having improved physical strength and high graft ratio.

The graft treated materials according to the first to fifth aspects of the invention are useful as stock for air cleaning chemical filters and ion-exchange filters used in pure water production equipment.

In the sixth aspect of the invention, long webs of substrate that have heretofore been difficult to handle can be subjected to a continuous radiation-induced graft polymerization treatment, making it possible to mass-produce long webs of woven or non-woven fabric material. As further advantages, the efficiency of radical utilization is high enough to reduce monomer consumption and the cleaning step after graft polymerization reaction can be eliminated. These combine to reduce the production cost. In addition, the products of graft polymerization are consistent in quality to have higher yield.

According to the seventh and eighth aspects of the invention, long webs of substrate can be subjected to a continuous radiation-induced graft polymerization treatment while maintaining their strength. This contributes to improving the quality of the products of graft polymerization.

The following examples are provided for further illustrating the present invention but are in no way to be taken as limiting.

EXAMPLE 1

A non-woven fabric was formed of polyethylene fiber having a diameter of 20 μm. It was subjected to embossing to prepare a non-woven fabric material having an areal density of 60 g/m$^2$ and a thickness of about 0.35 mm. Polyethylene filaments of 100 d (denier) were knitted as a reinforcement into the non-woven fabric material in a grid pattern having 2–3 mm openings. The thus prepared substrate in the form of a reinforced non-woven fabric had adequate strength and its tensile strength was 12 kg/5 cm in a longitudinal direction and 5 kg/5 cm In a transverse direction.

Figure 2:
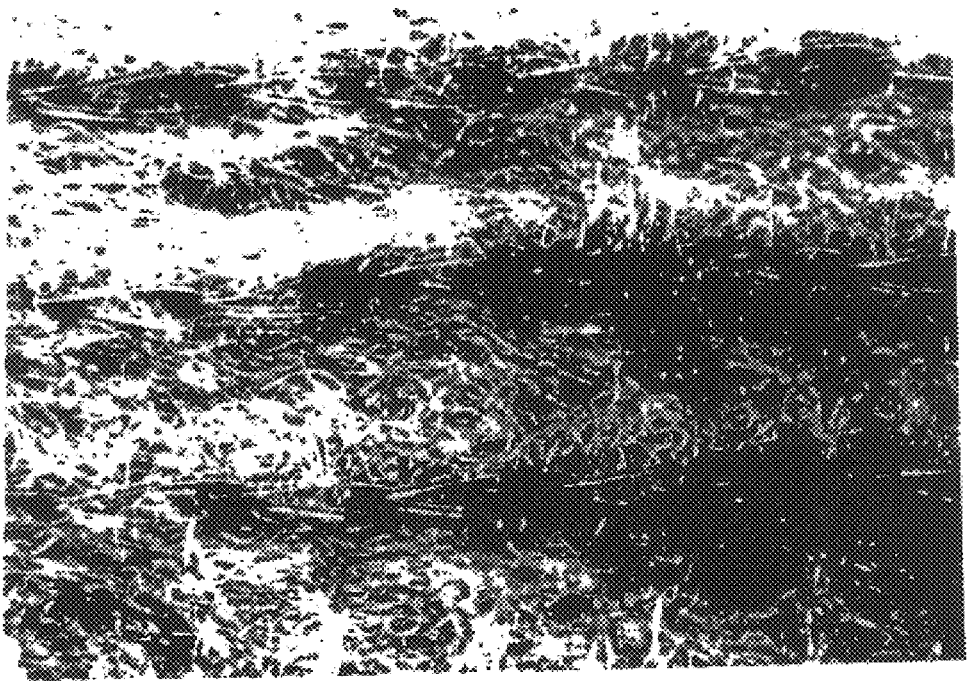
FIG. 2 is a micrograph showing how a polymer substrate for radiation-induced graft polymerization according to the first aspect of the invention which comprises a non-woven fabric composed of polyethylene fiber and reinforcing polyethylene filaments knitted into the non-woven fabric looks like on the fiber surface before radiation-induced graft polymerization.
Figure 3:
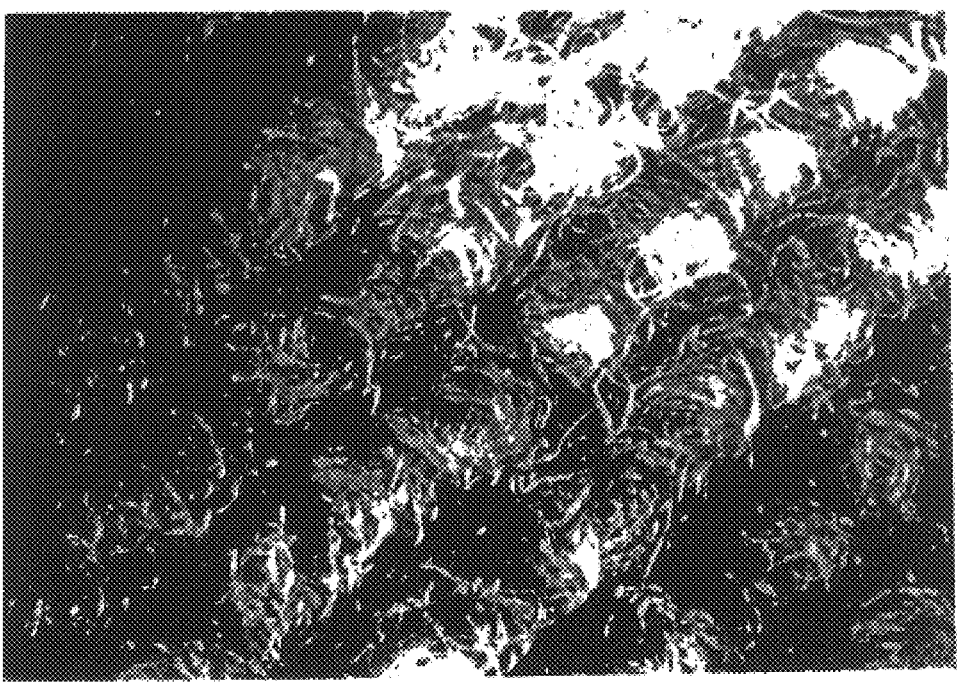
FIG. 3 is a micrograph showing how the polymer substrate of FIG. 2 looks like on the fiber surface after radiation-induced graft polymerization.

This substrate was exposed to 50 kGy of electron beams and reacted with glycidyl methacrylate for 2 hours to give a graft ratio of 146%. Filaments were taken from part of the grafting substrate and measured for the graft ratio of the reinforcement filaments, which was found to be 37%. Hence, the graft ratio of the non-woven fabric of polyethylene fiber was calculated to be about 160%. The appearance of the surface of the substrate before and after grafting is shown in FIGS. 2 and 3 (micrographs). The thickness of the substrate increased to about 1.7 mm since undulations formed on its surface as FIG. 3 shows. The substrate non-woven fabric was sulfonated with a solution of sodium sulfite to give a filament-reinforced, non-woven fabric of strong acidic cation-exchange fiber. Its neutral salt decomposition capacity measured to be 2.77 meq/g.

The tensile strength of the non-woven fabric material after grafting was 17 kg/5 cm in a longitudinal direction and 9 kg/5 cm in a transverse direction. Having higher tensile strength than before grafting, the non-woven fabric material in no case failed to maintain its shape during introduction of ion-exchange groups, nor did it suffer dislodging of fiber fragments.

Figure 8:
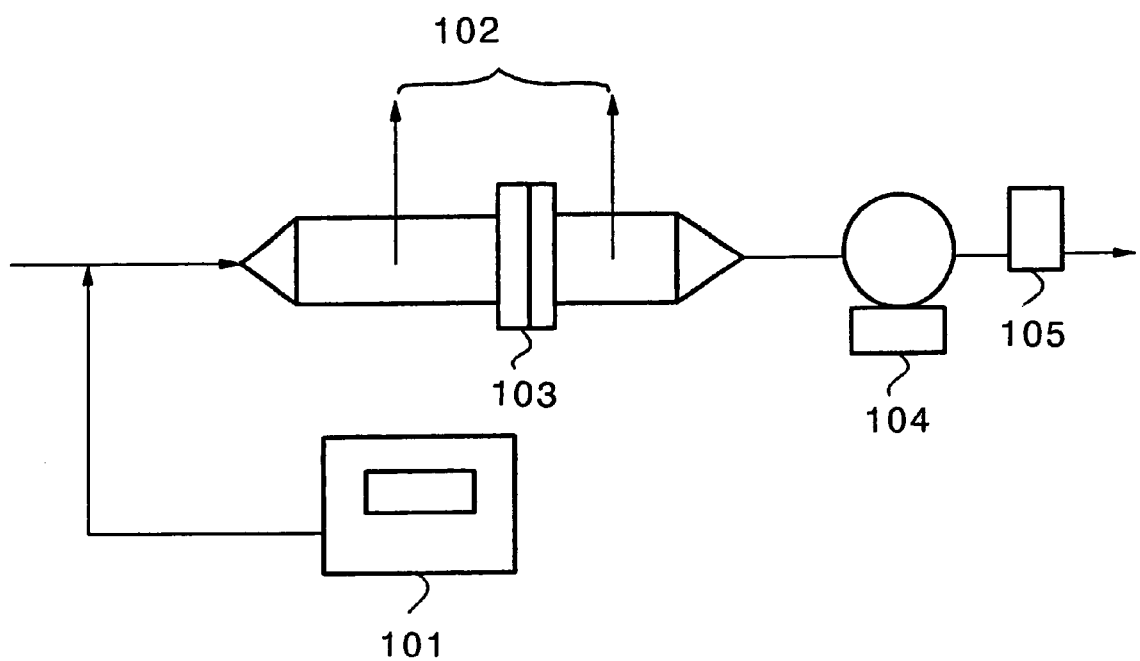
FIG. 8 is a schematic diagram of the equipment used to test the filter stock produced by grafting functional grafts onto a non-woven fabric according to the first aspect of the invention.

The same non-woven fabric material was used to mold pleated filters each having a cross-sectional area of 100 mm square, a depth of 50 mm and 10 peaks. No conventional separators were used in filter molding. Using a gas adsorption test apparatus of the configuration shown in FIG. 8, 5 ppm of ammonia gas was passed through the filters at a rate of 200 L/min. In FIG. 8, numeral 101 refers to a permeator, 102 a gas sampling line, 103 a filter mounting section, 104 a suction pump and 105 a flow meter. In the initial period, more than 99% of the ammonia supplied was removed. About 23 hours later, the ammonia removal dropped to 90% when the passage of ammonia gas was stopped. The exchange capacity consumption was 78%.

COMPARATIVE EXAMPLE 1

A non-woven fabric was prepared as in Example 1 except that reinforcement polyethylene filaments were not knitted into the fabric. It was then subjected to radiation-induced graft polymerization and sulfonation reaction as in

EXAMPLE 1

Before grafting, the non-woven fabric material had only small tensile strength values, 0.35 kg/5 cm in a longitudinal direction and 0.07 kg/5 cm in a transverse direction. The graft ratio was 131%; after the polymerization, the non-woven fabric was interspersed with fiber lumps and. varied in thickness between 1 and 5 mm; however its shape was substantially maintained.

After the sulfonation reaction, the non-woven fabric was difficult to handle and in spite of careful handling, it turned to fluffy mass and could not be processed into filters.

EXAMPLE 2

Figure 4:
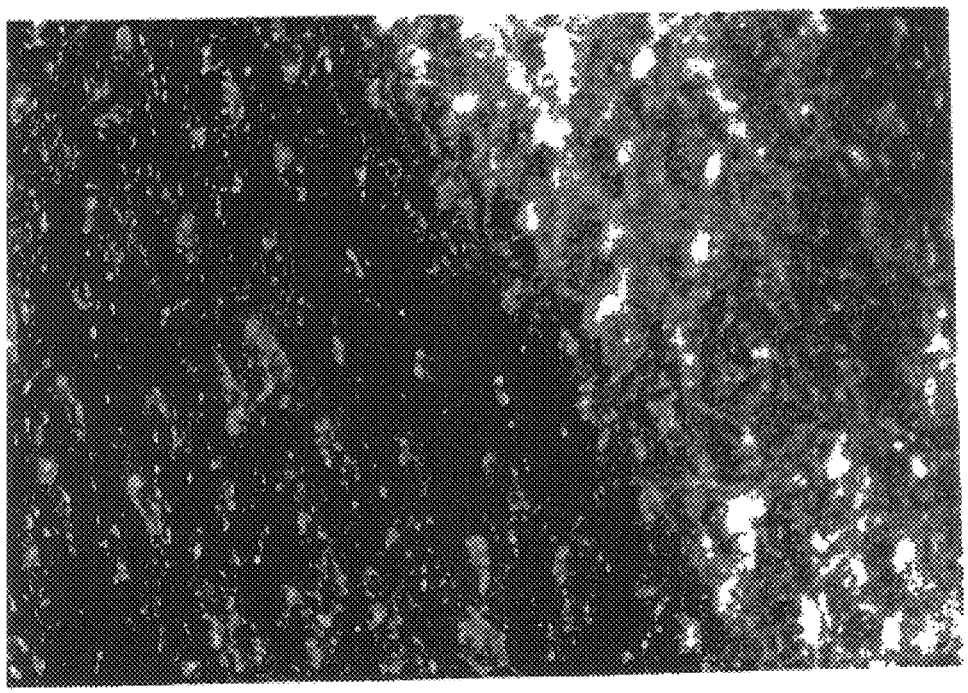
FIG. 4 is a micrograph showing how a polymer substrate for radiation-induced graft polymerization according to the first aspect of the invention which comprises a non-woven fabric composed of polyethylene fiber and s reinforcing polyethylene net fused to both sides of the non-woven fabric looks like on the fiber surface before radiation-induced graft polymerization.
Figure 5:
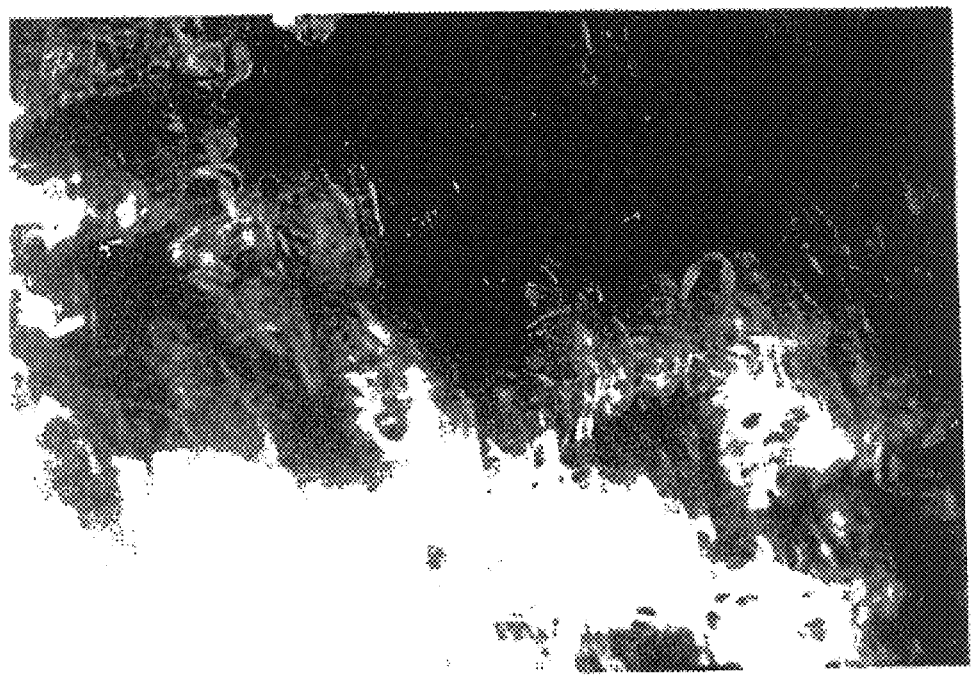
FIG. 5 is a micrograph showing how the polymer substrate of FIG. 4 looks like on the fiber surface after radiation-induced graft polymerization.

A non-woven fabric having an areal density of 65 g/m$^2$ and a thickness of 0.4 mm was formed of polyethylene fiber having a diameter of 10–30 μm. A polyethylene net was thermally fused to both sides of the non-woven fabric, thereby preparing a substrate for radiation-induced graft polymerization. The polyethylene net was prepared by the following procedure: a polyethylene film about 0.8 mm thick was torn into yarns which were rearranged in a grid pattern having 5 mm openings; further, yarns were stretched diagonally across the grids to form the reinforcement net. The non-woven fabric was then exposed to 50 kGy of electron beams and reacted with glycidyl methacrylate for 2 hours to give a graft ratio of 193%. The appearance of the surface of the substrate before and after graft polymerization is shown in FIGS. 4 and 5 (micrographs). The polyethylene net alone was subjected to radiation-induced graft polymerization under the same conditions and measured for its graft ratio, which was found to be 70%. Hence, the graft ratio of the polyethylene non-woven fabric without the net was calculated to be 275%. After radiation-induced graft polymerization, undulations formed on the surface of the non-woven fabric material, so its thickness increased to about 4.2 mm. The substrate was then sulfonated with a solution of sodium sulfite to produce a net-reinforced, non-woven fabric material of strong acidic cation-exchange fiber having a neutral salt decomposition capacity of 2.98 meq/g.

Before graft polymerization, the non-woven fabric material had adequate tensile strength values, 8 kg/5 cm in a longitudinal direction and 7 kg/5 cm in a transverse direction. Even after graft polymerization and sulfonation reaction, the tensile strength did not drop at all but increased to 9 kg/5 cm in a longitudinal direction and 15 kg/5 cm in a transverse direction. During the treatments mentioned above, the polyethylene fiber did not suffer any changes in shape or dislodging of fiber fragments.

Using this-non-woven fabric material but without using conventional separators, pleated filters were molded, each having a cross-sectional area of 100 mm square, a depth of 50 mm and 7 peaks. Using an experimental setup of the configuration shown in FIG. 8, 2 ppm of ammonia gas was passed through the filters at a rate of 200 L/min. Initially, more than 98% of the ammonia supplied was removed. About 61 hours later, the ammonia removal dropped to 90%,; when the passage of ammonia gas was stopped. The exchange capacity consumption was 74%.

COMPARATIVE EXAMPLE 2

A non-woven fabric of polyethylene fiber was prepared as in Example 2 except that no polyethylene nets were thermally fused. The non-woven fabric was then subjected to radiation-induced graft polymerization and sulfonation reaction under the same conditions as in Example 2 to produce a strong acidic, cation-exchange non-woven fabric having a neutral salt decomposition capacity of 3.04 meq/g. The tensile strength of this non-woven fabric material was 6 kg/5 cm in a longitudinal direction and 2 kg/5 cm in a transverse direction; due to careful handling, the non-woven fabric maintained its shape.

Using this non-woven fabric material, pleated filters were fabricated and subjected to a gas passage test as in Example 2. However, due to the "failure" of the non-woven fabric, the filters experienced such a great pressure loss that the flow rate of ammonia gas was no more than 132 L/min. To deal with this difficulty, a corrugated aluminum separator 5 mm wide was inserted between pleat peaks. This modified filter assembly was subjected to a gas passage test as in Example 2. The gas removal was 99% in the initial period of gas passage. When 90% removal was reached the passage of ammonia gas was stopped; the exchange-capacity consumption was 59% and lower than 74%, the value attained in Example 2.

EXAMPLE 3

Polyethylene fiber having a diameter of about 20 $\mu$m and polyethylene terephthalate fiber having a diameter of 15 $\mu$m were mixed at a weight ratio of 75:25. The mixed fibers were used to form a substrate in the form of a non-woven fabric having an areal density of 45 g/m$^2$ and a thickness of 0.25 mm. The tensile strength of this non-woven fabric was 8.2 kg/5 cm in a longitudinal direction and 6.7 kg/5 cm in a transverse direction.

A sample of this substrate non-woven fabric (20 cm×20 cm, 1.89 g containing 1.42 g of polyethylene) was subjected to a radiation-induced graft polymerization treatment as in Example 1 to give a graft product weighing 4.67 g; the graft ratio of glycidyl methacrylate onto polyethylene was therefore 196%. The non-woven fabric material was sulfonated as in Example 1 to give a strong acidic, cation-exchange non-woven fabric having a neutral salt decomposition capacity of 2.72 meq/g.

This non-woven fabric measured 19.4 cm long by 20.0 cm wide by 0.63 mm thick; with the exception of an increase in thickness, the fabric experienced little dimensional changes in both longitudinal and transverse directions. Its tensile strength was 7.5 kg/5 cm in a longitudinal direction and 6.1 kg/5 cm in a transverse direction; the drop in tensile strength was insignificant and the non-woven fabric had a sufficient strength to be processed into filters and to withstand transport for continuous reaction.

EXAMPLE 4

Using high-density polyethylene fiber of 6 deniers, a substrate in the form of a non-woven fabric having an areal density of 55 g/m$^2$ was prepared by spot welding. The tensile strength of the substrate was 5.3 kg/5 cm in a longitudinal direction and 4.1 kg/5 cm in a transverse direction.

The substrate non-woven fabric was exposed to 150 kGy of electron beams in a nitrogen atmosphere, impregnated with glycidyl methacrylate in an amount equal to 130% of the weight of the non-woven fabric and subjected to reaction at 50° C. for 4 hours, giving a glycidyl methacrylate graft ratio of 124%. The thus graft treated substrate was immersed in an aqueous solution containing 10% of sodium sulfite and 10% of isopropyl alcohol and sulfonated by reaction at 80° C. for 8 hours, producing a non-woven fabric material of strong acidic, cation-exchange fiber; its neutral salt decomposition capacity measured to be 2.61 meq/g.

Figure 9:
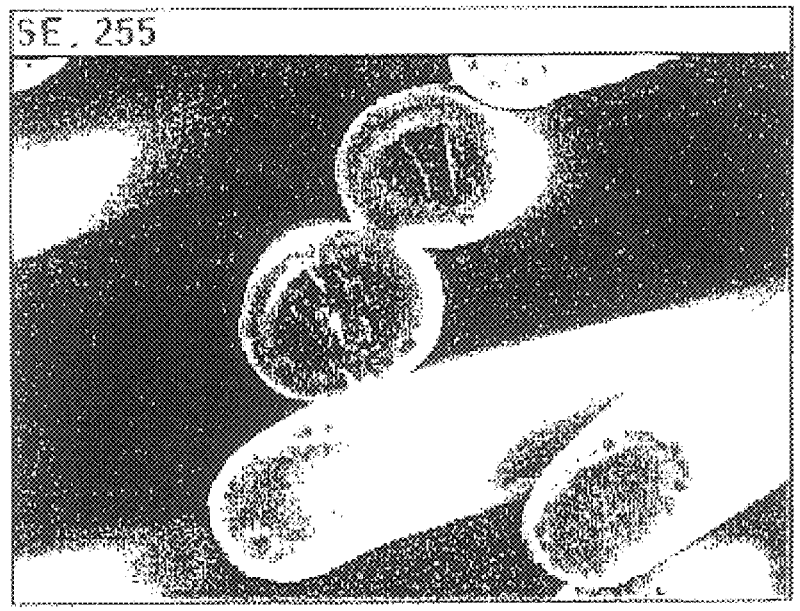
FIG. 9 shows by SEM and XMA a cross section of the high-density polyethylene fiber produced by radiation-induced graft polymerization in Example 4, FIG. 9a being a SEM micrograph of the fiber cross section and FIG. 9b an XMA micrograph showing the distribution of sulfur atoms in the fiber cross section.
Figure 9:
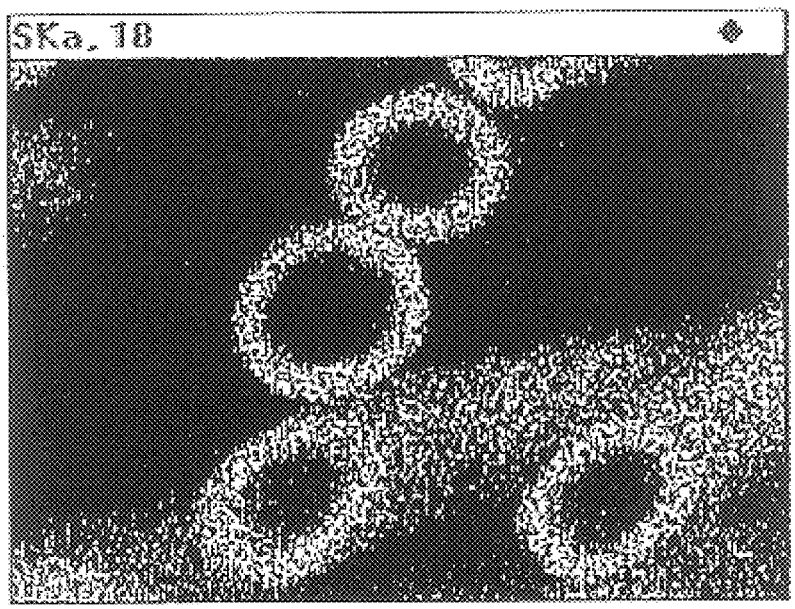

The graft treated non-woven fabric material was examined for the distribution of sulfur atoms in fiber cross section by SEM-XMA (scanning electron microscope/X-ray microanalyzer). FIG. 9 shows the SEM and XMA photographs taken for the non-woven fabric material; FIG. 9a is the SEM photograph of fiber cross sections and FIG. 9b is the XMA photograph showing the distribution of sulfur atoms in fiber cross sections. As is clear from FIG. 9b, sulfur atoms were present in about one third of the fiber radius as measured from the surface, indicating that the fiber had been graft polymerized in the area down to one third from the surface whereas about two thirds from the center remained unaffected by grafting. The tensile strength of the non-woven fabric material in a dry state was 4.6 kg/5 cm in a longitudinal direction and 3.7 kg/5 cm in a transverse direction; the drop in strength was only about 10% of the initial values and small enough to present no difficulties in the subsequent processing into filters.

COMPARATIVE EXAMPLE 3

Using low-density polyethylene fiber of 6 deniers, a substrate in the form of a non-woven fabric having an areal density of 60 g/m$^2$ was prepared by spot welding. The tensile strength of the substrate was 4.4 kg/5 cm in a longitudinal direction and 3.7 kg/5 cm in a transverse direction. This substrate was subjected to radiation-induced raft polymerization and sulfonated as in Example 1. With the substrate taken as a whole, the glycidyl methacrylate graft ratio was 130% before sulfonation. The product was a non-woven fabric material of strong acidic, cation-exchange fiber having a neutral salt decomposition capacity of 2.77 meq/g. Due to inadequate fiber strength, the non-woven fabric partly failed to maintain its shape and turned to fluffy mass.

Figure 10:
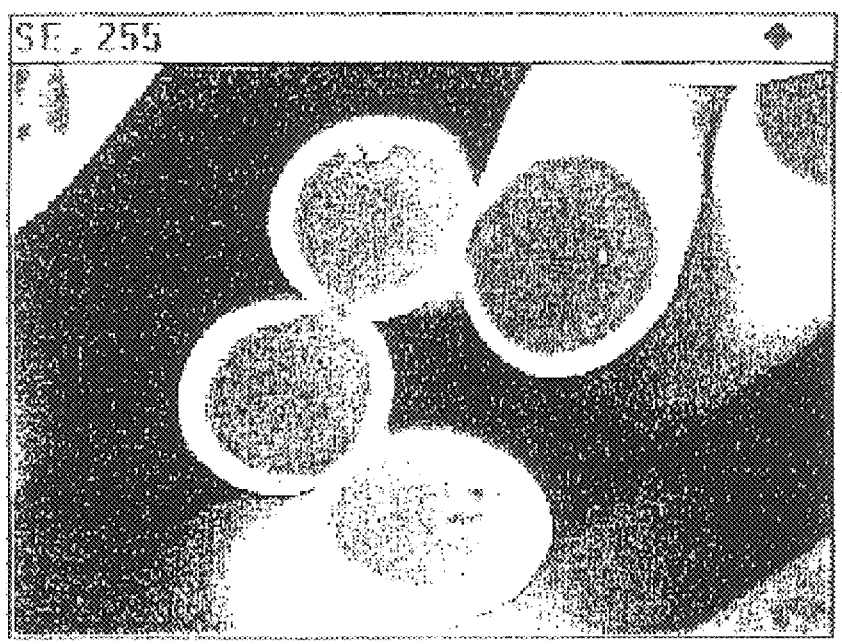
FIG. 10 shows by SEM and XMA a cross section of the low-density polyethylene fiber produced by radiation-induced graft polymerization in Comparative Example 3, FIG. 10a being a SEM micrograph of the fiber cross section and FIG. 10b an XMA micrograph showing the distribution of sulfur atoms in the fiber cross section.
Figure 10:
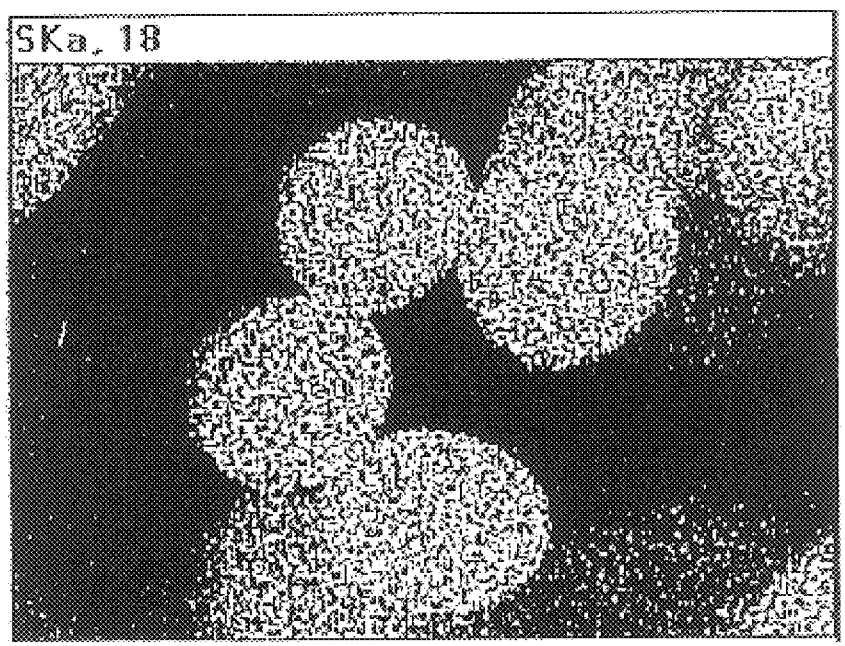

The graft treated non-woven fabric material was examined for the distribution of sulfur atoms in fiber crossection by SEM-XMA. FIG. 10 shows the SEM and XMA photographs taken for the non-woven fabric material; FIG. 10a is the SEM photograph of fiber cross sections and FIG. 10b is the XMA photograph showing the distribution of sulfur atoms in fiber cross sections. As is clear from FIG. 10b, sulfur atoms were present throughout fiber cross section down to the center, indicating that the graft reaction had progressed to the center of fiber cross section. Therefore, in Comparative Example 3, graft sites distributed throughout the cross section of the substrate in sharp contrast with Example 4 in which grafting occurred at higher density in the surface of the substrate.

The tensile strength of the graft treated non-woven fabric material was 1.4 kg/5 cm in a longitudinal direction and 0.3 kg/5 cm in a transverse direction; the drop in tensile strength was so great that the non-woven fabric material could not be processed into pleated filter stock without breaking or letting fine fiber scrap occur in a large quantity.

EXAMPLE 5

A long web sheet (50 cm wide by 600 m long) of a non-woven fabric having an areal density of 50 g/m$^2$ and a thickness of 0.3 mm was formed of polyethylene (PE) monofilaments having a diameter of about 15 $\mu$m and wound into a roll 7. The roll was set in a nitrogen replacement vessel 1 (see FIG. 1) and the leading end of the sheet was joined to a dummy net, which extended from a take-up roll 9 past a graft polymerization vessel 5, a monomer impregnation vessel 4 and an irradiator 3 such that its trailing end would reach the nitrogen replacement vessel 1. By rewinding the dummy sheet, the non-woven fabric sheet 2 would be fed forward continuously.

Both the nitrogen replacement vessel 1 and the shutter in the wall separating the compartment between the nitrogen replacement vessel 1 and the irradiator 3 were closed and the process consisting of evacuation to 50 mmHg and introduction of nitrogen up to one atmosphere was performed in two cycles to accomplish nitrogen replacement.

Then, a cooling gas produced by evaporating liquid nitrogen: was introduced from the compartment so that the temperature in the irradiating section of the irradiator 3 would be set to −20° C. and the oxygen concentration to 200–300 ppm at the outlet of the graft polymerization vessel 5.

The conditions for irradiation with the irradiator 3 were set to 300 keV and 15 mA and the drive rolls and the sheet rewinder were adjusted to transport the dummy sheet at a speed of 2 m/min.

In the next step, the dummy net was gradually taken up so that the non-woven fabric sheet 2 joined to the trailing end of the net was continuously brought into the irradiator 3 for irradiation, impregnated with a solution of glycidyl methacrylate in the monomer impregnation vessel 4 and subjected to graft polymerization reaction in the subsequent graft polymerization vessel 5 at 50° C. for 20 minutes. Using a separate non-woven fabric sheet, the squeeze were preadjusted to ensure that the irradiated non-woven fabric sheet would have a monomer impregnation ratio of 120%.

By measuring the areal density of the graft treated non-woven fabric sheet, the 600-m long sheet in a roll was calculated for graft ratio at 100-m intervals and the results are shown in Table 1. Considering the fluctuation in the real density of the substrate non-woven fabric per se, the graft treated non-woven fabric long web sheet obtained in Example 5 was very uniform in graft ratio.

For the calculation of graft ratio, the product of graft polymerization was immersed in a solution of dimethylformamide at 60° C. for 6 hours, washed with methanol and dried for weight measurement. The graft ratio was determined by the following equation:

Graft ratio=(weight after graft polymerization−weight before graft polymerization)/(weight before graft polymerization)×100(%)

TABLE 1

Graft ratio of 600-m long non-woven fabric long web sheet as calculated on the basis of areal density measurement

| Site of measurement* | 0 m | 100 m | 200 m | 300 m | 400 m | 500 m | 600 m |
|---|---|---|---|---|---|---|---|
| Areal density (g/m²) | 111 | 116 | 119 | 121 | 116 | 122 | 123 |
| Graft ratio (%) | 122 | 132 | 138 | 142 | 132 | 144 | 146 |

*The innermost end of the sheet rewound with the take-up roll 9 was found 0 m and the outermost end as 600 m.

COMPARATIVE EXAMPLE 4

A long web sheet of non-woven fabric material was subjected to graft polymerization under the same conditions as in Example 5 except that the oxygen concentration was set to 1300 ppm at the outlet of the graft polymerization vessel 5. The graft treated non-woven fabric material as taken up. with the sheet rewinder 9 was wet with the unreacted monomer, suggesting that the graft polymerization had not progressed to the fullest extent.

Graft ratio measurement was performed as in Example 4 and the results are shown in Table 2. As the sheet was taken up by about 300 m, there occurred some persistent increase in graft ratio and this was probably because the oxygen concentration decreased to some extent on account of the nitrogen stream.

TABLE 2

Graft ratio of 600-m long non-woven fabric web sheet as calculated on the basis of areal density measurement

| Site of measurement* | 0 m | 100 m | 200 m | 300 m | 400 m | 500 m | 600 m |
|---|---|---|---|---|---|---|---|
| Areal density (g/m²) | 52 | 53 | 56 | 54.5 | 61 | 65 | 70.5 |
| Graft ratio (%) | 4 | 6 | 12 | 9 | 22 | 30 | 41 |

*The innermost end of the sheet rewound with the take-up roll 9 was found 0 m and the outermost end as 600 m.

EXAMPLE 6

A web sheet of non-woven fabric which was the same as used in Example 5 was treated by the same method as in Example 5, except that the oxygen concentration at the outlet of the graft polymerization vessel 5 was set to 50–100 ppm, the conditions for irradiation with the irradiator 3 were set to 275 keV and 3 mA, and the transport speed of the dummly net was adjusted to 1.5 m/min. Not all of the transport rolls in the graft polymerization vessel 5 were used but some of them were bypassed to adjust the time of residence in the graft polymerization vessel 5 to 20 minutes.

The result was substantially the same as obtained in Example 5 and the graft ratio was high over the whole length of the graft treated web sheet in roll form.

EXAMPLE 7

A web sheet material of non-woven fabric (500 mm wide by 600 mm long) was prepared from the same substrate in the form of a reinforced non-woven fabric as used in Example 1 and subjected to radiation-induced graft polymerization by the same method as in Example 5. As in Example 5, the product of graft polymerization was uniform in that the graft ratio was within the range of 135%±15% over the full length of 0–600 mm.

The initial web had a width of 500±3 mm whereas the width of the graft treated web was 500±5 mm, causing hardly noticeable dimensional changes.

EXAMPLE 8

A web sheet material of non-woven fabric (500 mm wide by 600 mm long) was prepared from a substrate non-woven fabric that was formed of the same high-density polyethylene fiber as used in Example 4 and it was subjected to radiation-induced graft polymerization by the same method as in Example 5.

As in Example 5, the product of graft polymerization was uniform for practical purposes in that the graft ratio was within the range of 135%±19% over the full length of 0–600 mm.

The initial web had a width of 500±5 mm whereas the width of the graft treated web was 500±12 mm, causing hardly noticeable problems for practical purposes.

COMPARATIVE EXAMPLE 5

A web sheet material of non-woven fabric (500 mm wide by 600 mm long) was prepared from a substrate non-woven fabric that was formed of the same low-density polyethylene fiber as used in Comparative Example 3 and it was subjected to radiation-induced graft polymerization by the same method as in Example 5.

As soon as the reaction started, the web sheet shrank to a width of 400 m and less, tearing apart when a length of 43 m was unwound. The sheet did not have high enough tensile strength in a longitudinal direction to withstand reaction in web form.

The present invention can be implemented in the following various embodiments.

1. A polymer substrate for radiation-induced graft polymerization in the form of a woven or non-woven fabric that comprises a woven or non-woven fabric composed of polymer fiber and a reinforcement polymer having a greater strength and a slower rate of radiation-induced graft polymerization than said polymer fiber.
2. A polymer substrate for radiation-induced graft polymerization in the form of a woven or non-woven fabric that comprises a woven or non-woven fabric composed of polyethylene fiber and a reinforcement polyethylene having a greater strength and a slower rate of radiation-induced graft polymerization than said polyethylene fiber.
3. The polymer substrate for radiation-induced graft polymerization as set forth in the preceding paragraph 1 or 2, wherein said reinforcement is in the form of filaments which are knitted into the woven or non-woven fabric.
4. The polymer substrate for radiation-induced graft polymerization as set forth in the preceding paragraph 1 or 2, wherein said reinforcement is in the form of a net which is joined to the surface of the woven or non-woven fabric.
5. A polymer substrate for radiation-induced graft polymerization in the form of a woven or non-woven fabric which is formed by mixing polymer fiber with another polymer fiber having a slower rate of radiation-induced graft polymerization than said polymer fiber.
6. The polymer substrate for radiation-induced graft polymerization as set forth in the preceding paragraph 5, wherein said polymer fiber is polyethylene fiber and said another polymer is polyethylene terephthalate fiber.
7. Filter stock having undulations on the surface which has functional radicals introduced by radiation-induced graft polymerization into the polymer substrate for radiation-induced graft polymerization as set forth in any one of the preceding paragraphs 1–6.
8. The filter stock as set forth in the preceding paragraph 7, wherein said functional radicals are ion-exchange groups.
9. The filter stock as set forth in the preceding paragraph 8, which has glycidyl methacrylate introduced into the substrate woven or non-woven fabric by radiation-induced graft polymerization, with said ion-exchange groups having been introduced into said glycidylmethacrylate.
10. A filter fabricated by pleating the filter stock as set forth in any one of the preceding paragraphs 7–9.
11. A radiation graft treated material in the form of a woven or non-woven fabric material that is composed of polymer monofilament fiber of which only the surface has undergone a radiation-induced graft polymerization but of which the center remains unaffected by grafting.
12. A radiation graft treated material which is produced by performing a radiation-induced graft polymerization treatment on a polymer substrate for radiation-induced graft polymerization in the form of a woven or non-woven fabric that comprises a woven or non-woven fabric composed of polymer fiber and a reinforcement polymer having a greater strength and a slower rate of radiation-induced graft polymerization than said polymer fiber, said polymer fiber having been undergone the radiation-induced graft polymerization only in the surface thereof but the center of said polymer fiber remaining unaffected by grafting.
13. A radiation graft treated material which is produced by performing a radiation-induced graft polymerization treatment on a polymer substrate for radiation-induced graft polymerization in the form of a woven or non-woven fabric which is formed by mixing polymer fiber with another polymer fiber having a slower rate of radiation-induced graft polymerization than said polymer fiber, said polymer fiber having been undergone the radiation-induced graft polymerization only in the surface thereof but the center of said polymer remaining unaffected by grafting.
14. The radiation graft treated material as set forth in any one of the preceding paragraphs 1–13, wherein said woven or non-woven fabric material is composed of polyethylene monofilament fiber.
15. The radiation graft treated material as set forth in the preceding paragraph 14, wherein said polyethylene is high-density polyethylene.
16. The radiation graft treated material as set forth in any one of the preceding paragraphs 11–15, wherein functional radicals have been introduced by radiation-induced graft polymerization.
17. Filter stock composed of the radiation graft treated material as set forth in the preceding paragraph 16, wherein said functional radicals are ion-exchange groups.
18. The filter stock as set forth in the preceding paragraph 17, wherein,said functional radicals are selected from among a sulfone group, a quaternary ammonium group and a tertiary amino group that have been introduced via glycidyl methacrylate.
19. The filter stock as set forth in the preceding paragraph 17, wherein said functional radicals are ion-exchange groups that have been introduced by grafting sodium styrenesulfonate, vinylbenzyl trimethyl ammonium chloride or acrylic acid.
20. A process for producing the radiation graft treated material as set forth in any one of the preceding paragraphs 11–16, which comprises the steps of forming a woven or non-woven fabric from polymer monofilament fiber and subjecting said woven or non-woven fabric to a radiation-induced graft polymerization treatment under such controlled conditions that only the surface of said fiber undergoes the radiation-induced graft polymerization treatment but that the center of the fiber remains unaffected by grafting.
21. The process as set forth in the preceding paragraph 20, wherein said radiation-induced graft polymerization treatment is performed by a pre-irradiation impregnation graft polymerization method.
22. A process for producing the filter stock as set forth in the preceding paragraph 17, which comprises the steps of forming a woven or non-woven fabric from polymer monofilament fiber, introducing glycidyl methacrylate into said woven or non-woven fabric by subjecting it to a radiation-induced graft polymerization treatment under such conditions that only the surface of said fiber undergoes the radiation-induced graft polymerization treatment but that the center of the fiber remains unaffected by grafting, and then sulfonating it by reaction with sodium sulfite or aminating the same in an aqueous solution of diethanolamine.
23. A process for producing the filter stock as set forth in the preceding paragraph 17, which comprises the steps of forming a woven or non-woven fabric from polymer monofilament fiber and introducing sodium styrenesulfonate, vinylbenzyl trimethyl ammonium chloride or acrylic acid into said woven or non-woven fabric by subjecting it to a radiation-induced graft polymerization treatment under such conditions that only the surface of said fiber undergoes the radiation-induced graft polymerization treatment but that the center of the fiber remains unaffected by grafting.

24. A method for performing radiation-induced graft polymerization on substrates in the form of webs of woven or non-woven fabric, comprising the steps of exposing a substrate in the form of a woven or non-woven fabric to electron beams in a nitrogen atmosphere, contacting the irradiated substrate with a specified amount of monomer in a nitrogen atmosphere, and subjecting the monomer and the substrate in mutual contact to graft polymerization in a nitrogen atmosphere, said first through third steps being performed in succession.

25. The method for performing radiation-induced graft polymerization on substrates in the form of webs of woven or non woven fabric as set forth in the preceding paragraph 24, wherein the step of exposing the substrate to electron beams is preceded by a preliminary step of replacing the air in the substrate with nitrogen gas, said preliminary through third steps being performed in succession.

26. The method for performing radiation-induced graft polymerization on substrates in the form of webs of woven or non-woven fabric as set forth in the preceding paragraph 24 or 25, wherein contact between the substrate and the monomer in the second step is performed by first immersing the substrate in a solution of the monomer and then displacing from the substrate the monomer solution unnecessary for graft polymerization.

27. The method for performing radiation-induced graft polymerization on substrates in the form of webs of woven or non-woven fabric as set forth in any one of the preceding paragraphs 24–26, wherein the oxygen concentration in the nitrogen atmosphere in the third step is no more than 1000 ppm.

28. The method for performing radiation-induced graft polymerization on substrates in the form of webs of woven or non-woven fabric as set forth in any one of the preceding paragraphs 24–27, wherein the conditions for exposure to electron beams are a voltage of 100 keV–500 keV, an electron beam current of 3 mA–50 mA and an exposure of 30 kGy–200 kGy.

29. The method for performing radiation-induced graft polymerization on substrates in the form of webs of woven or non-woven fabric as set forth in any one of the preceding paragraphs 24–28, wherein the temperature of said substrate being exposed to electron beams in the first step is between −50° C. and +50° C.

30. The method for performing radiation-induced graft polymerization on substrates in the form of webs of woven or non-woven fabric as set forth in any one of the preceding paragraphs 25–29, wherein the nitrogen replacement in the preliminary step is accomplished by performing the process consisting of evacuation and introduction of nitrogen in at least one cycle.

31. The method for performing radiation-induced graft polymerization as set forth in any one of the preceding paragraphs 24–30, wherein the woven or non-woven fabric is a polymer substrate for radiation-induced graft polymerization in the form of a woven or non-woven fabric that comprises a woven or non-woven fabric composed of polymer fiber and a reinforcement polymer having a greater strength and a slower rate of radiation-induced graft polymerization than said polymer fiber.

32. The method for performing radiation-induced graft polymerization as set forth in any one of the preceding paragraphs 24–30, wherein the woven or non-woven fabric is a polymer substrate for radiation-induced graft polymerization in the form of a woven or non-woven fabric which is formed by mixing polymer fiber with another polymer having a slower rate of radiation-induced graft polymerization than said polymer fiber.

33. The method for performing radiation-induced graft polymerization as set forth in any one of the preceding paragraphs 24–32, wherein radiation-induced graft polymerization reaction is performed such that only the surface of the fiber of which the substrate woven or non-woven fabric undergoes radiation-induced graft polymerization whereas the center of the fiber remains unaffected by grafting.

34. The method for performing radiation-induced graft polymerization as set forth in any one of the preceding paragraphs 24–33, wherein a substrate transporting web material that need not be subjected to a radiation-induced graft polymerization treatment is joined to the leading end and/or the trailing end of the substrate in the form of a web of woven or non-woven fabric and transported through a reaction apparatus to transport the substrate web of woven or non-woven fabric through the reaction apparatus and wherein the substrate web of woven or non-woven fabric is severed from the substrate transporting web material after the end of the reaction.

35. An apparatus for performing a continuous radiation-induced graft polymerization treatment on substrates in the form of a web of woven or non-woven fabric, which consists of a series arrangement of an electron beam exposing unit for applying electron beams to a substrate in the form of a web of woven or non-woven fabric in a nitrogen atmosphere, a monomer impregnating vessel for bringing the irradiated substrate into contact with a specified amount of a monomer in a nitrogen atmosphere and a graft polymerization vessel for grafting the monomer onto the substrate in a nitrogen atmosphere, which apparatus further including a transport means by which the substrate web of woven or non-woven fabric is continuously passed through said units of the apparatus in the order written.

36. The apparatus as set forth in the preceding paragraph 35, which has a nitrogen replacement vessel provided upstream of the electron beam exposing unit for replacing the air in the substrate woven or non-woven fabric by nitrogen gas.

What is claimed is:

1. An apparatus for performing a continuous radiation-induced graft polymerization treatment on substrates in the form of a web of woven or non-woven fabric, which comprises a series arrangement of an electron beam exposing unit for applying electron beams to a substrate in the form of a web of woven or non-woven fabric in a nitrogen atmosphere, a monomer impregnating vessel for bringing the irradiated substrate into contact with a specified amount of a monomer in a nitrogen atmosphere and a graft polymerization vessel for grafting the monomer onto the substrate in a nitrogen atmosphere, which apparatus further including a transport means by which the substrate web of woven or non-woven fabric is continuously passed through said units of the apparatus in the order written, the graft polymerization vessel including sheet transport rolls which form a long, zigzag pathway of the substrate web.

2. The apparatus as set forth in claim 1, which has a nitrogen replacement vessel provided upstream of the electron beam exposing unit for replacing the air in the substrate woven or non-woven fabric by nitrogen gas.

3. The apparatus as set forth in claim 2, wherein the substrate web of woven or non-woven fabric comprises a woven or non-woven fabric composed of polymer fiber and a reinforcement polymer having a greater strength and a slower rate of radiation-induced graft polymerization than the polymer fiber, wherein the nitrogen replacement vessel includes a means for joining the woven or non-woven fabric composed of polymer fiber with the reinforcement polymer to form the substrate web, and wherein the apparatus further comprises a means for separating the substrate web into the woven or non-woven fabric composed of polymer fiber with the reinforcement polymer after the graft polymerization reaction is completed.

* * * * *